United States Patent
Abe et al.

(10) Patent No.: US 11,938,952 B2
(45) Date of Patent: Mar. 26, 2024

(54) TRAVELING TRAJECTORY ESTIMATION SYSTEM, TRAVELING TRAJECTORY ESTIMATION PROGRAM, AND TRAVELING TRAJECTORY ESTIMATING METHOD

(71) Applicant: TOYOTA JIDOSHA KABUSHIKI KAISHA, Toyota (JP)

(72) Inventors: Sadayuki Abe, Sunto-gun Shizuoka-ken (JP); Taichi Kawanai, Susono (JP); Kazuhiko Kamikado, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 17/546,300

(22) Filed: Dec. 9, 2021

(65) Prior Publication Data
US 2022/0234595 A1    Jul. 28, 2022

(30) Foreign Application Priority Data

Jan. 28, 2021   (JP) ................................ 2021-012304

(51) Int. Cl.
   *B60W 40/10*         (2012.01)
   *B60W 50/00*         (2006.01)
   (Continued)

(52) U.S. Cl.
   CPC ........ *B60W 40/10* (2013.01); *B60W 50/0205* (2013.01); *B60W 50/14* (2013.01);
   (Continued)

(58) Field of Classification Search
   CPC . B60W 2050/0054; B60W 2050/0083; B60W 2050/021; B60W 2050/0215; B60W 2050/143; B60W 2050/146; B60W 2520/14; B60W 2520/28; B60W 2540/18; B60W 2556/10; B60W 2556/60;
   (Continued)

(56) References Cited

U.S. PATENT DOCUMENTS 9,983,013 B1 *   5/2018   Krunic ............... G01C 21/3644
11,294,371 B2 *  4/2022   Letwin ................ G05D 1/0077
(Continued)

FOREIGN PATENT DOCUMENTS

EP   4001039 A1 *  5/2022   .......... B60W 30/143
JP   2019-139400 A  8/2019

*Primary Examiner* — Babar Sarwar
(74) *Attorney, Agent, or Firm* — Dinsmore & Shohl LLP

(57) ABSTRACT

A traveling trajectory estimation system obtains traveling record information indicating a past traveling record of a vehicle, and characteristic object position information indicating the installation position of a characteristic object, and performs a vehicle position estimation process to estimate an object vehicle position at an object time, based on the traveling record information and the characteristic object position information. In the vehicle position estimation process, not only a time previous to the object time, but also a time subsequent to the object time, is used as a reference time. The traveling trajectory estimation system sets each of a plurality of successive times as the object time, and performs the vehicle position estimation process, to estimate the object vehicle positions at the respective times, and determines a collection of the estimated object vehicle positions as a traveling trajectory of the vehicle.

11 Claims, 17 Drawing Sheets

(51) Int. Cl.
  *B60W 50/02*  (2012.01)
  *B60W 50/14*  (2020.01)
  *G06V 20/58*  (2022.01)

(52) U.S. Cl.
  CPC ..... *G06V 20/58* (2022.01); *B60W 2050/0054* (2013.01); *B60W 2050/0083* (2013.01); *B60W 2050/021* (2013.01); *B60W 2050/0215* (2013.01); *B60W 2050/143* (2013.01); *B60W 2050/146* (2013.01); *B60W 2520/14* (2013.01); *B60W 2520/28* (2013.01); *B60W 2540/18* (2013.01); *B60W 2556/10* (2020.02); *B60W 2556/60* (2020.02)

(58) Field of Classification Search
  CPC .. B60W 40/10; B60W 50/0205; B60W 50/14; G06V 20/56; G06V 20/58
  See application file for complete search history.

(56) References Cited

U.S. PATENT DOCUMENTS

| | | | |
|---|---|---|---|
| 11,390,165 B2* | 7/2022 | Koebler | G08G 1/096844 |
| 11,760,356 B2* | 9/2023 | Hashimoto | B60W 30/18154 |
| | | | 701/25 |
| 2019/0243382 A1* | 8/2019 | Takaki | G01C 21/3476 |
| 2020/0160070 A1* | 5/2020 | Sholingar | G06T 7/70 |
| 2020/0209860 A1* | 7/2020 | Zhang | B60W 60/00274 |
| 2020/0290620 A1* | 9/2020 | Al Qizwini | G06F 16/29 |
| 2021/0097311 A1* | 4/2021 | McBeth | H04W 4/80 |
| 2021/0157325 A1* | 5/2021 | Beller | G05D 1/0088 |
| 2022/0242239 A1* | 8/2022 | Koebler | F16D 61/00 |

* cited by examiner

TRAVELING TRAJECTORY ESTIMATION SYSTEM, TRAVELING TRAJECTORY ESTIMATION PROGRAM, AND TRAVELING TRAJECTORY ESTIMATING METHOD

CROSS-REFERENCE TO RELATED APPLICATION

This application claims priority to Japanese Patent Application No. 2021-012304 filed on Jan. 28, 2021, incorporated herein by reference in its entirety.

BACKGROUND

1. Technical Field

The disclosure relates to a technology for estimating a traveling trajectory of a vehicle.

2. Description of Related Art

"Localization (self-location estimation)" is known as operation of a vehicle to estimate the self-location during traveling (see, for example, Japanese Unexamined Patent Application Publication No. 2019-139400 (JP 2019-139400 A)). In the localization, internal sensors that detect traveling conditions, such as the wheel speed and the steering angle, and external sensors that recognize characteristic objects around the vehicle are used. A vehicle position estimated based on the results of detection by the internal sensors is combined with a vehicle position estimated based on the results of recognition by the external sensors, so that the final vehicle position is determined.

SUMMARY

It is useful to estimate the actual traveling trajectory of the vehicle with high accuracy. For example, it is possible to evaluate the accuracy of the localization, and detect an abnormality in the sensors, by comparing the actual traveling trajectory with the vehicle positions estimated by the localization, for example.

The disclosure provides a technology for estimating the traveling trajectory of a vehicle with high accuracy.

A first aspect of the disclosure is concerned with a traveling trajectory estimation system. The traveling trajectory estimation system includes a storage device that stores traveling record information indicating a past traveling record of a vehicle, and characteristic object position information indicating an installation position of a characteristic object, and a processor configured to perform a traveling trajectory estimation process to estimate a traveling trajectory of the vehicle, based on the traveling record information and the characteristic object position information. The traveling record information includes vehicle traveling information including a traveling state or a position of the vehicle detected by an internal sensor installed on the vehicle, and external recognition information including information on the characteristic object recognized by an external sensor installed on the vehicle. The traveling trajectory estimation process includes a vehicle position estimation process for estimating a vehicle position as a position of the vehicle. An object vehicle position is the vehicle position at an object time. A first reference vehicle position is the vehicle position at a first reference time previous to the object time. A second reference vehicle position is the vehicle position at a second reference time subsequent to the object time. A first vehicle movement amount is a movement amount of the vehicle between the first reference time and the object time. A second vehicle movement amount is the movement amount of the vehicle between the second reference time and the object time. The vehicle position estimation process includes a step of obtaining the first vehicle movement amount and the second vehicle movement amount, based on the vehicle traveling information, a step of obtaining a relative position of the characteristic object recognized at the object time, based on the external recognition information, a step of calculating the object vehicle position as an internal estimated vehicle position, based on the first reference vehicle position, the first vehicle movement amount, the second reference vehicle position, and the second vehicle movement amount, a step of calculating the object vehicle position as an external estimated vehicle position, based on the installation position of the characteristic object indicated by the characteristic object position information and the relative position of the characteristic object at the object time, and a step of estimating the object vehicle position by combining the internal estimated vehicle position with the external estimated vehicle position. The processor is configured to set each of a plurality of successive times as the object time, and perform the vehicle position estimation process, to estimate a plurality of object vehicle positions at the respective times, and determine a collection of the object vehicle positions estimated, as the traveling trajectory of the vehicle.

A second aspect of the disclosure is concerned with a traveling trajectory estimation program executed by a computer. The traveling trajectory estimation program causes the computer, when executed by the computer, to perform an information acquisition process to acquire traveling record information indicating a past traveling record of a vehicle, and characteristic object position information indicating an installation position of a characteristic object, and a traveling trajectory estimation process to estimate a traveling trajectory of the vehicle, based on the traveling record information and the characteristic object position information. The traveling record information includes vehicle traveling information including a traveling state or a position of the vehicle detected by an internal sensor installed on the vehicle, and external recognition information including information on the characteristic object recognized by an external sensor installed on the vehicle. The traveling trajectory estimation process includes a vehicle position estimation process for estimating a vehicle position as a position of the vehicle. An object vehicle position is the vehicle position at an object time. A first reference vehicle position is the vehicle position at a first reference time previous to the object time. A second reference vehicle position is the vehicle position at a second reference time subsequent to the object time. A first vehicle movement amount is a movement amount of the vehicle between the first reference time and the object time. A second vehicle movement amount is the movement amount of the vehicle between the second reference time and the object time. The vehicle position estimation process includes a step of obtaining the first vehicle movement amount and the second vehicle movement amount, based on the vehicle traveling information, a step of obtaining a relative position of the characteristic object recognized at the object time, based on the external recognition information, a step of calculating the object vehicle position as an internal estimated vehicle position, based on the first reference vehicle position, the first vehicle movement amount, the second reference vehicle position, and the second vehicle movement amount, a step of calculating the object vehicle position as an external estimated vehicle position, based on the installation position of the characteristic object indicated by the characteristic object position information and the relative position of the characteristic object at the object time, and a step of estimating the object vehicle position by combining the internal estimated vehicle position with the external estimated vehicle position. The traveling trajectory estimation process includes a step of setting each of a plurality of successive times as the object time, and performing the vehicle position estimation process, to estimate a plurality of object vehicle positions at the respective times, and a step of determining a collection of the object vehicle positions estimated, as the traveling trajectory of the vehicle.

A third aspect of the disclosure is concerned with a traveling trajectory estimating method. The traveling trajectory estimating method includes an information acquisition process to acquire traveling record information indicating a past traveling record of a vehicle, and characteristic object position information indicating an installation position of a characteristic object, and a traveling trajectory estimation process to estimate a traveling trajectory of the vehicle, based on the traveling record information and the characteristic object position information. The traveling record information includes vehicle traveling information including a traveling state or a position of the vehicle detected by an internal sensor installed on the vehicle, and external recognition information including information on the characteristic object recognized by an external sensor installed on the vehicle. The traveling trajectory estimation process includes a vehicle position estimation process for estimating a vehicle position as a position of the vehicle. An object vehicle position is the vehicle position at an object time. A first reference vehicle position is the vehicle position at a first reference time previous to the object time. A second reference vehicle position is the vehicle position at a second reference time subsequent to the object time. A first vehicle movement amount is a movement amount of the vehicle between the first reference time and the object time. A second vehicle movement amount is the movement amount of the vehicle between the second reference time and the object time. The vehicle position estimation process includes a step of obtaining the first vehicle movement amount and the second vehicle movement amount, based on the vehicle traveling information, a step of obtaining a relative position of the characteristic object recognized at the object time, based on the external recognition information, a step of calculating the object vehicle position as an internal estimated vehicle position, based on the first reference vehicle position, the first vehicle movement amount, the second reference vehicle position, and the second vehicle movement amount, a step of calculating the object vehicle position as an external estimated vehicle position, based on the installation position of the characteristic object indicated by the characteristic object position information and the relative position of the characteristic object at the object time, and a step of estimating the object vehicle position by combining the internal estimated vehicle position with the external estimated vehicle position. The traveling trajectory estimation process includes a step of setting each of a plurality of successive times as the object time, and performing the vehicle position estimation process, to estimate a plurality of object vehicle positions at the respective times, and a step of determining a collection of the object vehicle positions estimated, as the traveling trajectory of the vehicle.

According to the disclosure, the vehicle position estimation process is performed, based on the traveling record information indicating the past traveling record of the vehicle, to estimate the vehicle positions at a plurality of times, respectively, namely, estimate the traveling trajectory of the vehicle. In the vehicle position estimation process, not only the time previous to the object time, but also the time subsequent to the object time, is used as the reference time. Namely, the number of restriction conditions is increased, as compared with general localization. Accordingly, the accuracy in estimation of the traveling trajectory is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of the disclosure will be described with reference to the drawings.

Figure 1:
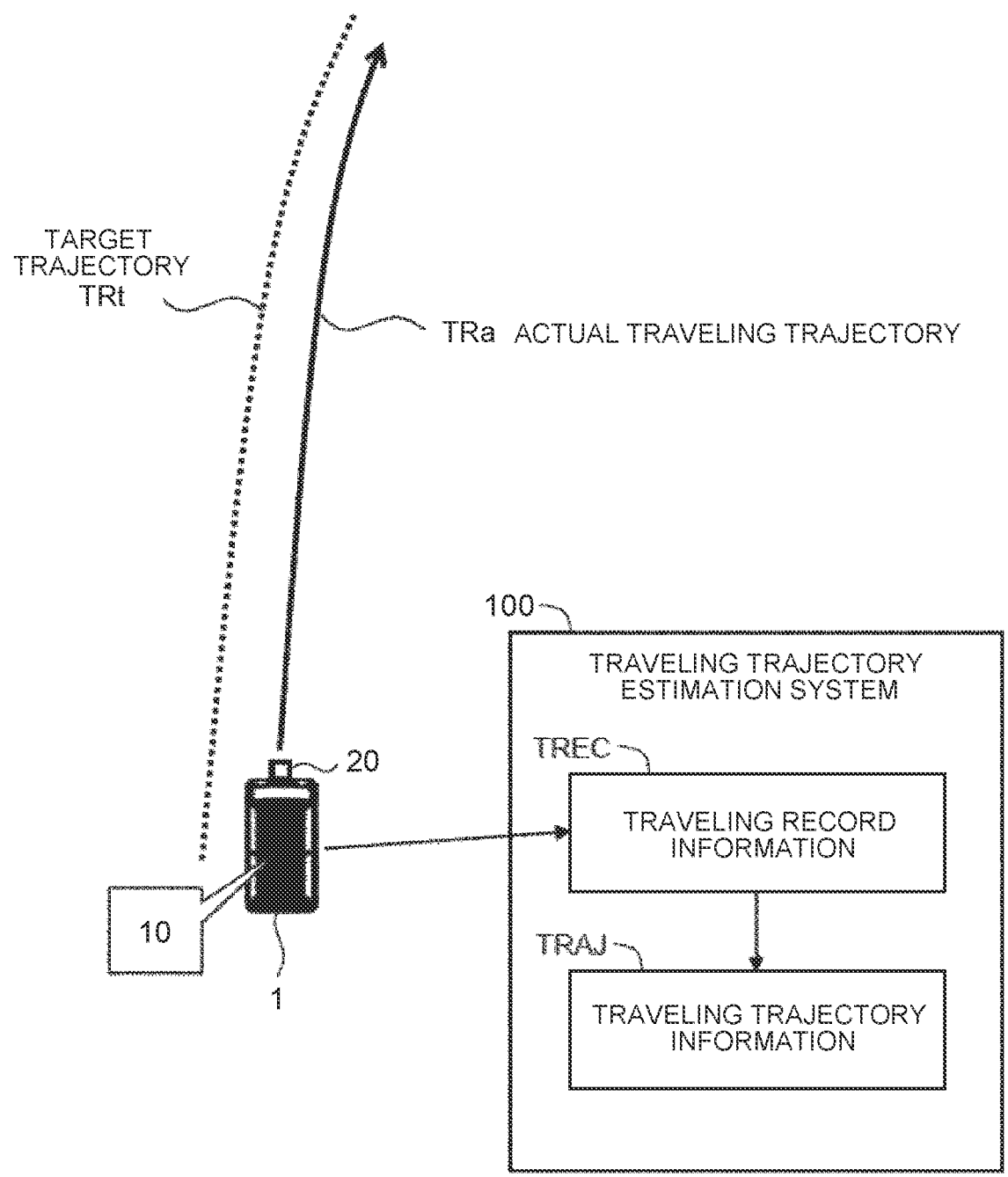
FIG. 1 is a schematic view useful for briefly describing a vehicle control system and a traveling trajectory estimation system according to one embodiment of the disclosure.

FIG. 1 is a schematic view useful for briefly describing a vehicle control system 10 and a traveling trajectory estimation system 100 according to the embodiment.

The vehicle control system 10 performs "vehicle traveling control" to control traveling of a vehicle 1. Typically, the vehicle control system 10 is installed on the vehicle 1. Alternatively, at least a part of the vehicle control system 10 may be located in an external device outside the vehicle 1, so as to remotely control the vehicle 1. Namely, the vehicle control system 10 may be split between and located in the vehicle 1 and the external device.

Examples of the vehicle traveling control include automatic driving control, driving assistance control, and so forth. The automatic driving control is to control automatic driving of the vehicle 1. Examples of the driving assistance control include risk avoidance control, lane keep assist (LKA) control, and so forth. As the risk avoidance control, at least one of steering control and speed reduction control is performed so as to reduce the risk of collision between the vehicle 1 and an object. The lane keep assist control is to cause the vehicle 1 to travel along a driving lane. Under the vehicle traveling control, a target trajectory TRt of the vehicle 1 is produced by the vehicle control system 10, for example. The target trajectory TRt is a collection of target positions of the vehicle 1. For example, the target trajectory TRt is produced so as to extend along the center of the lane. A target velocity may be set for each target position. Then, the vehicle control system 10 performs vehicle traveling control so that the vehicle 1 follows the target trajectory TRt. The vehicle traveling control may also be called "trajectory following control".

In the vehicle traveling control, a typical example of which is the trajectory following control, the "vehicle position" as the position of the vehicle 1 is used. The accuracy of the vehicle position is important, so as to ensure accuracy of the vehicle traveling control. To this end, the vehicle control system 10 performs "localization" to estimate the vehicle position with high accuracy. For the localization, sensors 20 installed on the vehicle 1 are used. The localization will be described in detail later.

On the other hand, it is useful to obtain the actual traveling trajectory TRa of the vehicle 1 with high accuracy. For example, it is possible to evaluate the performance of the trajectory following control, by comparing the actual traveling trajectory TRa with the target trajectory TRt. In another example, it is possible to evaluate the accuracy of the localization, or detect an abnormality in the sensors 20, by comparing the actual traveling trajectory TRa with the vehicle positions estimated by the localization.

Thus, in this embodiment, a technology for estimating the traveling trajectory of the vehicle 1 with high accuracy is proposed.

The traveling trajectory estimation system 100 according to this embodiment estimates the past traveling trajectory of the vehicle 1 with high accuracy. More specifically, the traveling trajectory estimation system 100 obtains traveling record information TREC indicating the past traveling record (traveling log) of the vehicle 1. Then, the traveling trajectory estimation system 100 performs "traveling trajectory estimation" to estimate the past traveling trajectory of the vehicle 1, based on the traveling record information TREC. The traveling trajectory information TRAJ indicates "estimated traveling trajectory TRe" estimated through the traveling trajectory estimation. As will be described later, the estimated traveling trajectory TRe obtained in this embodiment reproduces the actual traveling trajectory TRa with high accuracy.

The traveling trajectory estimation system 100 according to this embodiment may have a function of analyzing the traveling trajectory information TRAJ (the estimated traveling trajectory TRe). For example, the traveling trajectory estimation system 100 can evaluate the performance of the trajectory following control, by comparing the estimated traveling trajectory TRe with the target trajectory TRt. In another example, the traveling trajectory estimation system 100 can evaluate the accuracy of the localization, or detect an abnormality in the sensors 20, by comparing the estimated traveling trajectory TRe with the vehicle positions estimated through the localization.

At least a part of the traveling trajectory estimation system 100 may be included in the vehicle control system 10.

A traveling trajectory estimation process according to this embodiment will be described in further detail.

1. Localization

Figure 2:
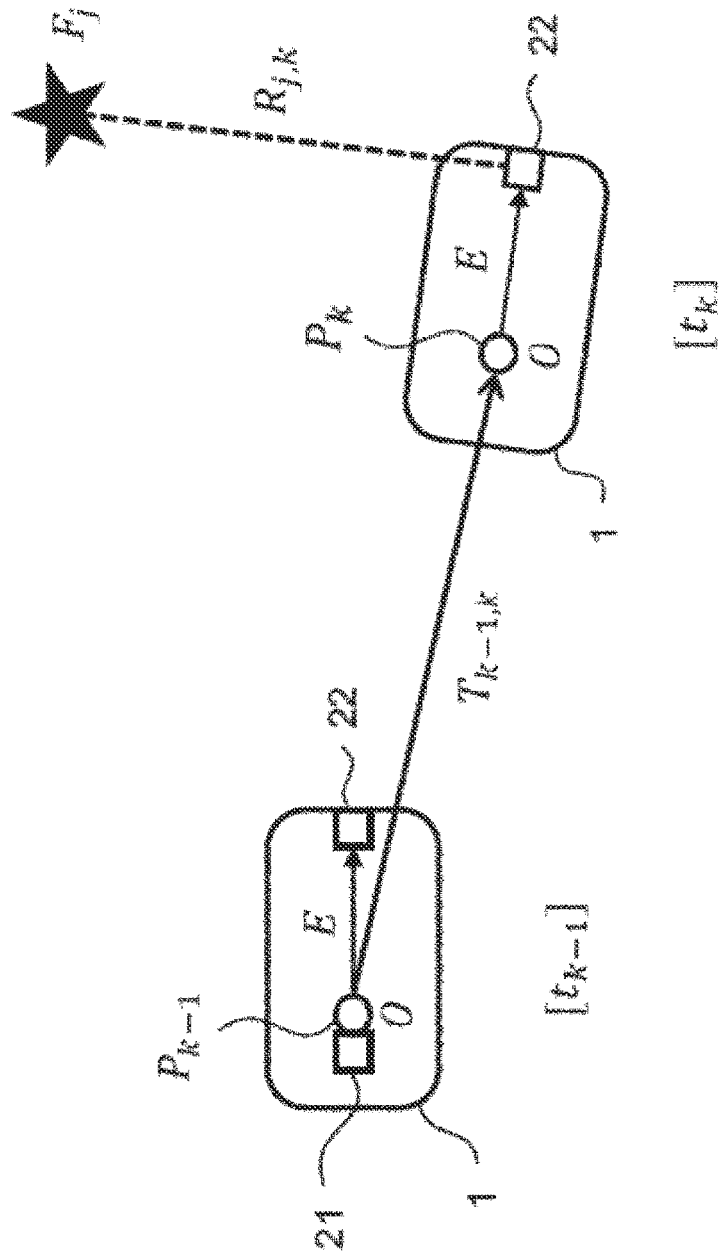
FIG. 2 is a schematic view useful for describing general localization performed during traveling of a vehicle.
Figure 3:
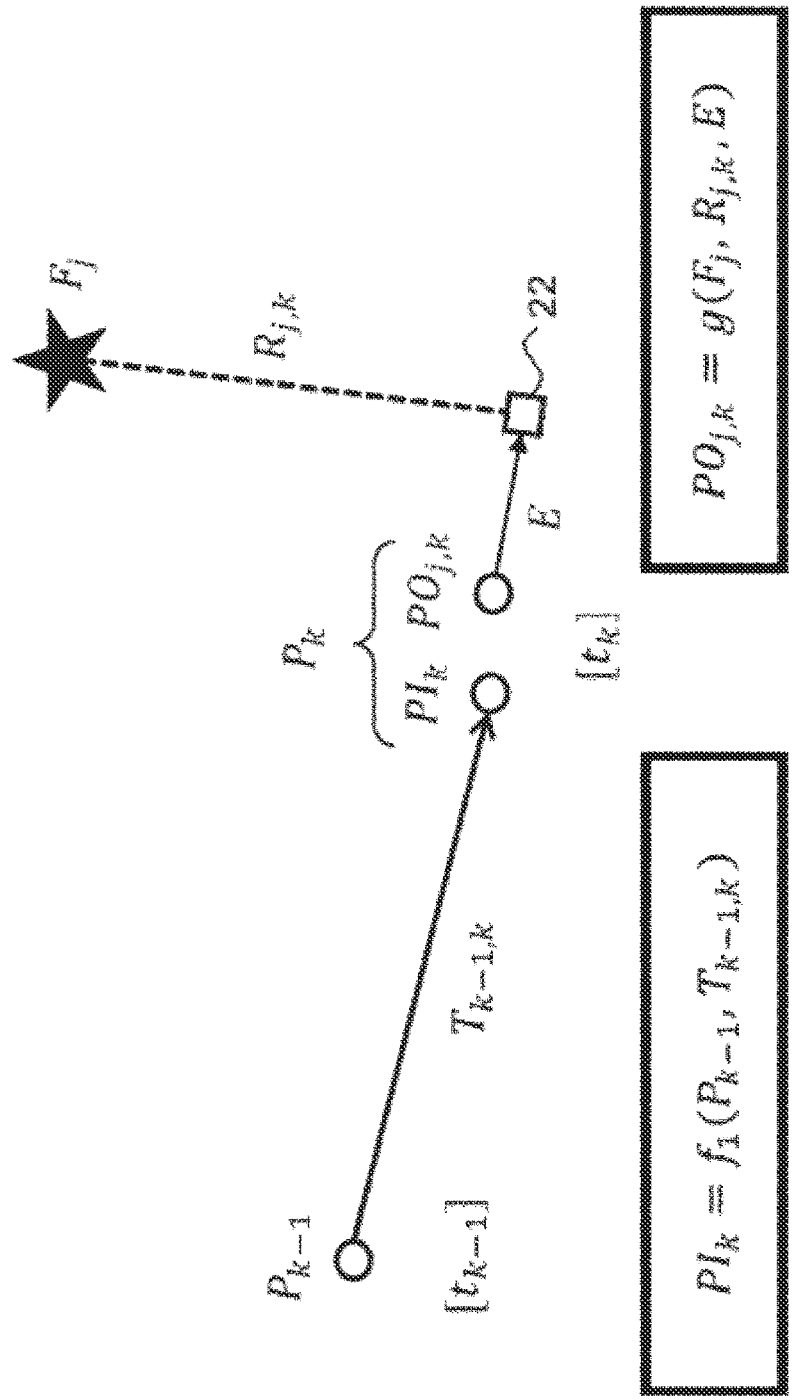
FIG. 3 is a schematic view useful for describing general localization performed during traveling of the vehicle.
Figure 4:
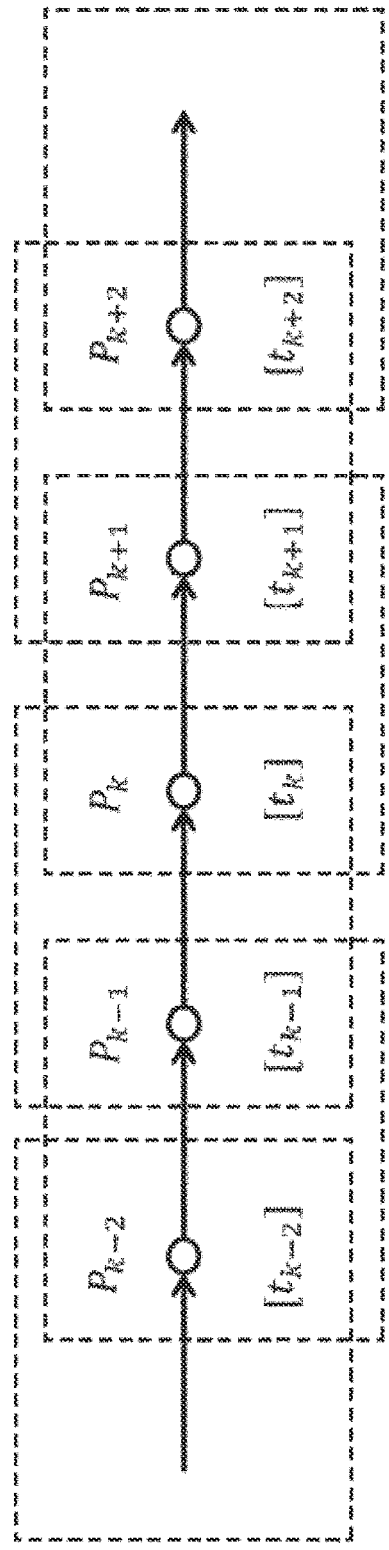
FIG. 4 is a schematic view useful for describing general localization performed during traveling of the vehicle.

To promote understanding of the traveling trajectory estimation according to this embodiment, general localization carried out during traveling of the vehicle 1 will be initially described. FIG. 2 to FIG. 4 are schematic views useful for describing general localization.

In localization, the sensors 20 installed on the vehicle 1 are used. As shown in FIG. 2, the sensors 20 include internal sensors 21 and external sensors 22. The internal sensors 21 detect traveling conditions or position of the vehicle 1. The internal sensors 21 include, for example, a wheel speed sensor, steering angle sensor, yaw rate sensor, inertial measurement unit (IMU), global positioning system (GPS) sensor, and so forth. The external sensors 22 recognize the environment of the vehicle 1. The external sensors 22 include, for example, LIDAR (Laser Imaging Detection and Ranging), cameras, radar, and so forth.

A vehicle coordinate system is a relative coordinate system that is fixed to the vehicle 1, and changes as the vehicle 1 moves. The position of the origin O of the vehicle coordinate system in the vehicle 1 is arbitrarily selected. A calibration parameter E indicates the installation position and installation direction of an external sensor 22 in the vehicle coordinate system. Namely, the calibration parameter E represents the translational and rotary movement amount (rotation matrix+translation amount) of the external sensor 22 relative to the origin O.

The vehicle position P is the absolute position of the vehicle 1 in the absolute coordinate system. The vehicle position P may be said to be the position of the origin O of the vehicle coordinate system in the absolute coordinate system. The absolute coordinate system is defined by longitude and latitude, for example.

In the localization during traveling of the vehicle 1, the vehicle position P is estimated in given cycles. For the sake of convenience, time $t_k$ and vehicle position $P_k$ to be estimated will be called "object time $t_k$" and "object vehicle position $P_k$", respectively. To estimate the object vehicle position $P_k$ at the object time $t_k$, a vehicle position $P_{k-1}$ at the previous time $t_{k-1}$ is used. For the sake of convenience, the previous time $t_{k-1}$ and the vehicle position $P_{k-1}$ will be called "reference time $t_{k-1}$" and "reference vehicle position $P_{k-1}$", respectively.

A vehicle movement amount $T_{k-1,\ k}$ is the movement amount (translational and rotary movement amount) of the vehicle 1 between the reference time $t_{k-1}$ and the object time $t_k$. The vehicle movement amount $T_{k-1,\ k}$ can be calculated based on the detection results obtained by the internal sensors 21. For example, the vehicle movement amount $T_{k-1, k}$ can be calculated based on track records of the wheel speed and steering angle detected in a period between the reference time $t_{k-1}$ and the object time $t_k$. In another example, the vehicle movement amount $T_{k-1, k}$ may be calculated from the rough position and orientation of the vehicle 1 detected by the GPS sensor.

Also, it is possible to recognize one or more characteristic objects j present around the vehicle 1, by using the external sensors 22. Typically, the characteristic objects j are stationary objects. Examples of the characteristic objects j include a white lane, pole, utility pole, road sign, signboard, and so forth. The absolute position $F_j$ of a characteristic object j in the absolute coordinate system is known. For example, the absolute position $F_j$ of the characteristic object j is registered in map information. On the other hand, the relative position $R_{j, k}$ of the characteristic object j relative to the external sensor 22 is calculated, based on the result of recognition by the external sensor 22 at time $t_k$. Namely, the relative position $R_{j, k}$ of each of one or more characteristic objects j at time $t_k$ is calculated.

FIG. 3 is a schematic view useful for describing "internal estimated vehicle position $PI_k$" and "external estimated vehicle position $PO_{j, k}$" at the object time $t_k$. The internal estimated vehicle position $PI_k$ is the object vehicle position $P_k$ calculated (estimated) from the reference vehicle position $P_{k-1}$ at the reference time $t_{k-1}$ and the vehicle movement amount $T_{k-1, k}$ obtained from the internal sensors 21. Namely, the internal estimated vehicle position $PI_k$ is represented by a function of the reference vehicle position $P_{k-1}$ and the vehicle movement amount $T_{k-1, k}$. On the other hand, the external estimated vehicle position $PO_{j, k}$ is the object vehicle position $P_k$ calculated (estimated) from the absolute position $F_j$ of a characteristic object j, the relative position $R_{j, k}$ of the characteristic object j relative to the external sensor 22, and the calibration parameter E. Namely, the external estimated vehicle position $PO_{j, k}$ is represented by a function of the absolute position $F_j$ and relative position $R_{j, k}$ of the characteristic object j, and the calibration parameter E.

The internal estimated vehicle position $PI_k$ does not necessarily match the external estimated vehicle position $PO_{j, k}$ regarding one or more characteristic objects j. Accordingly, the object vehicle position $P_k$ at the object time $t_k$ is determined, by combining the internal estimated vehicle position $PI_k$ with the external estimated vehicle position $PO_{j, k}$ regarding one or more characteristic objects j. For example, the object vehicle position $P_k$ is determined, by correcting the internal estimated vehicle position $PI_k$ so as to best match the external estimated vehicle position $PO_{j, k}$ regarding one or more characteristic objects j. In other words, the object vehicle position $P_k$ is optimized, by using an evaluation function based on the internal estimated vehicle position $PI_k$ and the external estimated vehicle position $PO_{j, k}$. In this connection, the evaluation function and the method of optimization are known, and are not particularly limited in this embodiment.

The object vehicle position $P_k$ thus estimated is used as the reference vehicle position at the next time $t_{k+1}$.

With the above process repeated, the vehicle position P is sequentially estimated during traveling of the vehicle 1, as shown in FIG. 4. By combining the internal estimated vehicle position $PI_k$ with the external estimated vehicle position $PO_{j, k}$ regarding one or more characteristic objects j, it is possible to obtain the vehicle position P with higher accuracy than the rough vehicle position detected by the GPS sensor, for example.

2. Traveling Trajectory Estimation

Next, the traveling trajectory estimation performed by the traveling trajectory estimation system 100 according to this embodiment will be described.

2-1. Concept

The traveling trajectory estimation is to estimate the past traveling trajectory of the vehicle 1. The past traveling trajectory of the vehicle 1 is provided by a collection of vehicle positions $P_1$ to $P_n$ at a plurality of successive times $t_1$ to $t_n$ in the past. Here, "n" is an integer equal to or larger than two. The traveling trajectory estimation includes operation to estimate the vehicle positions $P_1$ to $P_n$ at the respective successive times $t_1$ to $t_n$ in the past. This operation will be called "vehicle position estimation", so as to be distinguished from general localization as described above.

The vehicle position estimation is performed based on "traveling record information TREC" indicating the past traveling record (traveling log) of the vehicle 1. The traveling record information TREC includes "vehicle traveling information" and "external recognition information". The vehicle traveling information indicates the result of detection by the internal sensor or sensors 21 installed on the vehicle 1. More specifically, the vehicle traveling information includes traveling conditions, such as the wheel speed, steering angle, and yaw rate of the vehicle 1, or a rough vehicle position detected by the GPS sensor. On the other hand, the external recognition information indicates the result of recognition by the external sensor or sensors 22 installed on the vehicle 1. More specifically, the external recognition information includes information on a characteristic object j recognized by the external sensor 22. The external recognition information may include the relative position $R_{j, k}$ of the characteristic object j relative to the external sensor 22.

Figure 5:
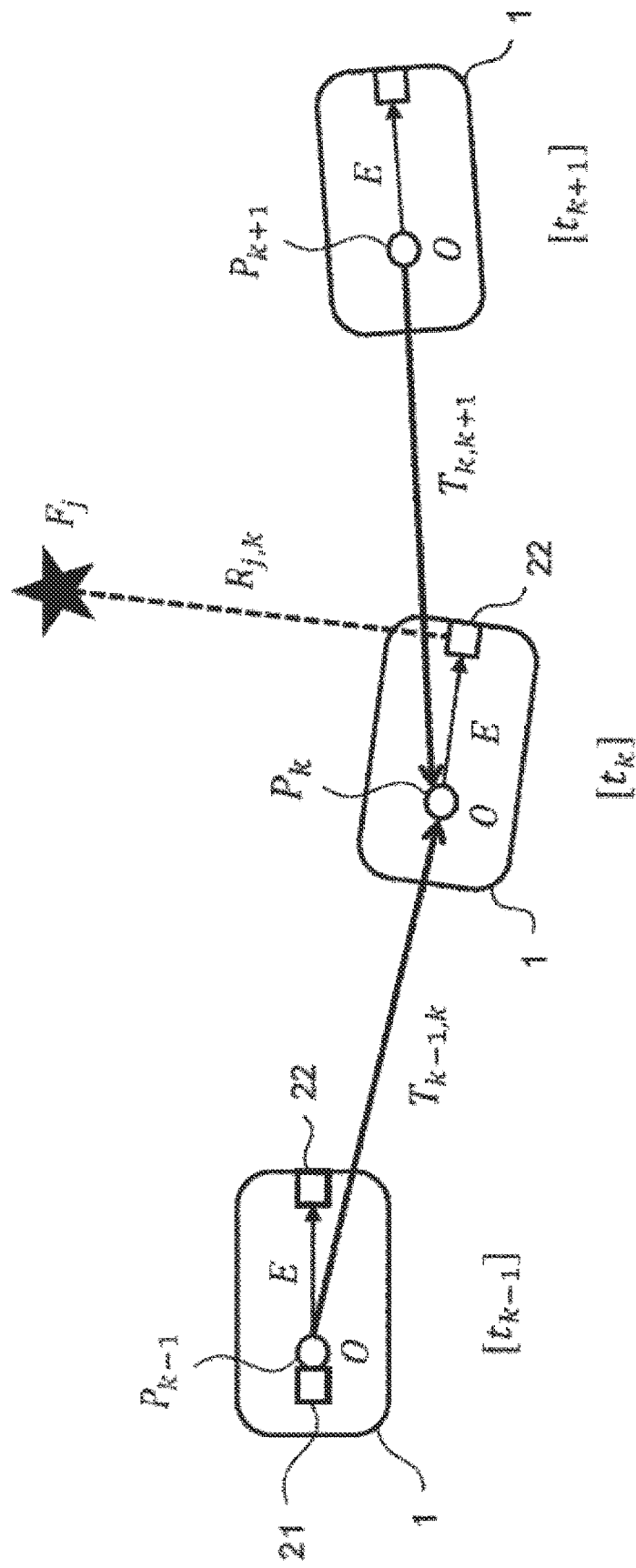
FIG. 5 is a schematic view useful for describing a vehicle position estimation process according to the embodiment of the disclosure.
Figure 6:
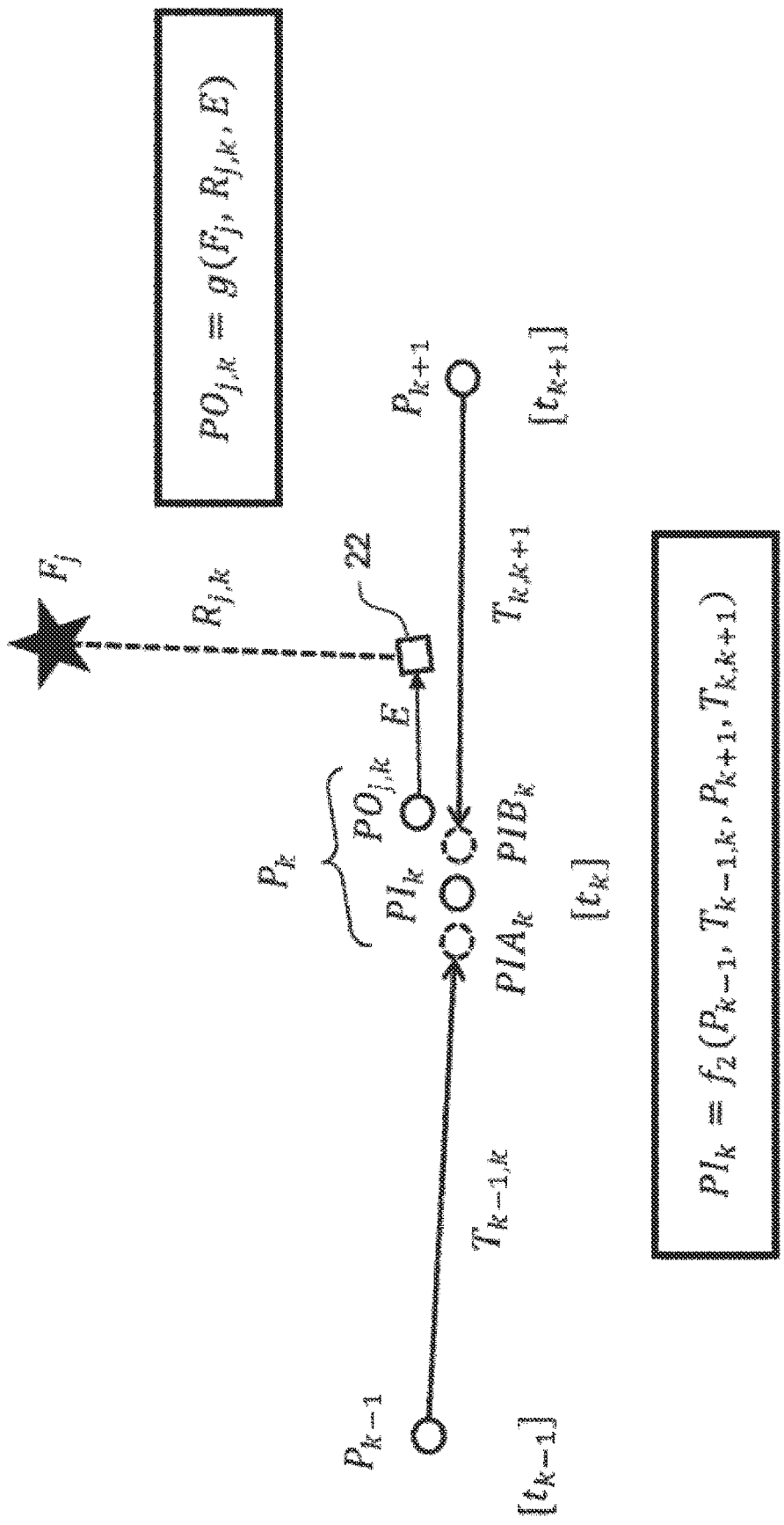
FIG. 6 is a schematic view useful for describing the vehicle position estimation process according to the embodiment of the disclosure.
Figure 7:
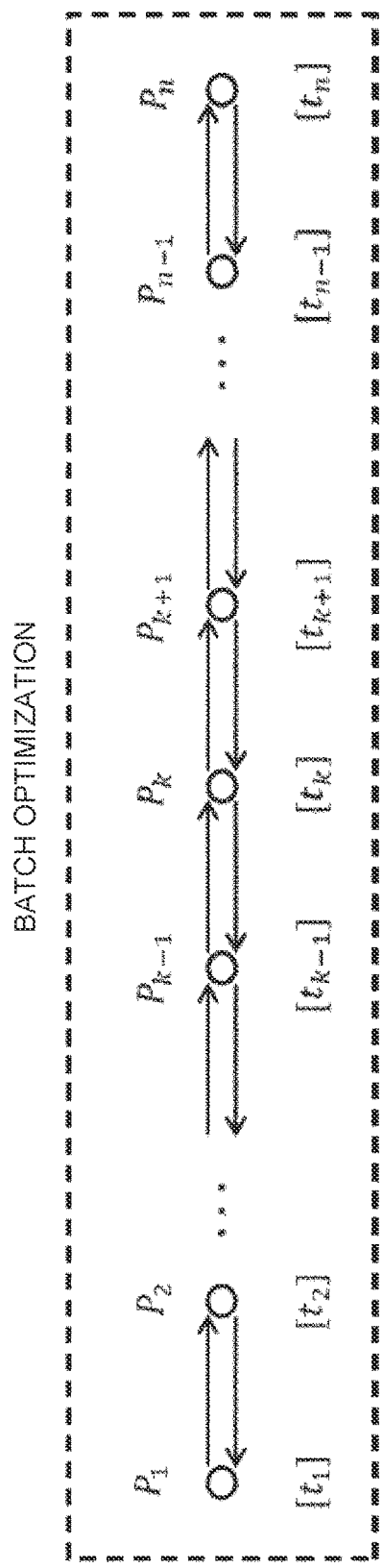
FIG. 7 is a schematic view useful for describing the vehicle position estimation process according to the embodiment of the disclosure.

FIG. 5 to FIG. 7 are schematic views useful for describing the vehicle position estimation according to this embodiment. As in the case of the localization as described above, the object vehicle position $P_k$ at the object time $t_k$ is estimated based on the reference vehicle position at the reference time. However, not only the time $t_{k-1}$ previous to the object time $t_k$, but also the time $t_{k+1}$ subsequent to the object time $t_k$, is used as the reference time. Since the past traveling record information TREC can be used, it is possible to use the information later than the object time $t_k$, in addition to the information prior to the object time $t_k$.

First reference time $t_{k-1}$ is the reference time previous to the object time $t_k$. First reference vehicle position $P_{k-1}$ is the reference vehicle position at the first reference time $t_{k-1}$. First vehicle movement amount $T_{k-1, k}$ is the amount of movement of the vehicle 1 between the first reference time $t_{k-1}$ and the object time $t_k$. As in the case of the localization as described above, the first vehicle movement amount $T_{k-1, k}$ is calculated based on the vehicle traveling information included in the traveling record information TREC.

Second reference time $t_{k+1}$ is the reference time subsequent to the object time $t_k$. Second reference vehicle position $P_{k+1}$ is the reference vehicle position at the second reference time $t_{k+1}$. Second vehicle movement amount $T_{k, k+1}$ is the amount of movement of the vehicle 1 between the second reference time $t_{k+1}$ and the object time $t_k$. As in the case of the localization, the second vehicle movement amount $T_{k+1, k}$ is calculated based on the vehicle traveling information included in the traveling record information TREC.

FIG. 6 is a schematic view useful for describing the internal estimated vehicle position $PI_k$ and the external estimated vehicle position $PO_{j,k}$ at the object time $t_k$. First internal estimated vehicle position $PIA_k$ is the object vehicle position $P_k$ calculated (estimated) from the first reference vehicle position $P_{k-1}$ at the first reference time $t_{k-1}$ and the first vehicle movement amount $T_{k-1,k}$. On the other hand, second internal estimated vehicle position $PIB_k$ is the object vehicle position $P_k$ calculated (estimated) from the second reference vehicle position $P_{k+1}$ at the second reference time $t_{k+1}$ and the second vehicle movement amount $T_{k,k+1}$. The internal estimated vehicle position $PI_k$ is calculated by combining the first internal estimated vehicle position $PIA_k$ with the second internal estimated vehicle position $PIB_k$. For example, the internal estimated vehicle position $PI_k$ is a middle position between the first internal estimated vehicle position $PIA_k$ and the second internal estimated vehicle position $PIB_k$. Thus, the internal estimated vehicle position $PI_k$ is represented by a function of the first reference vehicle position $P_{k-1}$, the first vehicle movement amount $T_{k-1,k}$, the second reference vehicle position $P_{k+1}$, and the second vehicle movement amount $T_{k,k+1}$.

The external estimated vehicle position $PO_{j,k}$ is obtained in a similar manner to the case of the localization as described above. Namely, the external estimated vehicle position $PO_{j,k}$ is the object vehicle position $P_k$ calculated (estimated) from the absolute position $F_j$ of a characteristic object j, the relative position $R_{j,k}$ of the characteristic object j relative to the external sensor 22, and the calibration parameter E. The external estimated vehicle position $PO_{j,k}$ is calculated based on the external recognition information included in the traveling record information TREC.

Then, as in the case of the localization as described above, the object vehicle position $P_k$ at the object time $t_k$ is determined, by combining the internal estimated vehicle position $PI_k$ with the external estimated vehicle position $PO_{j,k}$ regarding one or more characteristic objects j. For example, the object vehicle position $P_k$ is determined, by correcting the internal estimated vehicle position $PI_k$ so as to best match the external estimated vehicle position $PO_{j,k}$ regarding one or more characteristic objects j. In other words, the object vehicle position $P_k$ is optimized, by using an evaluation function based on the internal estimated vehicle position $PI_k$ and the external estimated vehicle position $PO_{j,k}$.

FIG. 7 schematically indicates the total optimization of the vehicle position P. In the case of the vehicle position estimation, the past traveling record information TREC can be used, and all of the vehicle movement amounts $T_{1,2}$-$T_{n-1,n}$ at times $t_1$ to $t_n$ have been found out. Accordingly, as shown in FIG. 7, it is possible to set the above times $t_1$ to $t_{n-1}$ "in parallel" as the object time $t_k$, and perform vehicle position estimation via batch processing. Namely, the object vehicle positions $P_1$ to $P_n$ at the respective times $t_1$ to $t_n$ can be optimized collectively. The total optimization is in contrast to the sequential localization as shown in FIG. 4.

The initial values of the vehicle positions $P_1$ to $P_n$ at the respective times $t_1$ to $t_n$ are obtained from the vehicle traveling information included in the traveling record information TREC. For example, the rough vehicle positions $P_1$ to $P_n$ detected with the GPS sensor are set as the initial values. In another example, the initial values of the vehicle positions $P_1$ to $P_n$ may be set, by adding the vehicle movement amounts $T_{1,2}$ to $T_{n-1,n}$ to the vehicle position $P_n$ detected with the GPS sensor. Another vehicle position $P_x$ may be used as the point of origin, in place of the vehicle position $P_1$.

After setting the initial values of the vehicle positions $P_1$ to $P_n$, the traveling trajectory estimation system 100 repeatedly executes the vehicle position estimation process as described above. The object vehicle positions $P_1$ to $P_n$ estimated in the last cycle of the vehicle position estimation process are set as the vehicle positions $P_1$ to $P_n$ (the first reference vehicle position $P_{k-1}$, the second reference vehicle position $P_{k+1}$) in the current cycle of the vehicle position estimation process. As a result, the vehicle positions $P_1$ to $P_n$ are updated each time the vehicle position estimation process is carried out. While the vehicle positions $P_1$ to $P_n$ change each time the vehicle position estimation process is executed, the amount of the change is gradually reduced. This is called "convergence calculation". The convergence of the vehicle positions $P_1$ to $P_n$ means improvement in the accuracy of the vehicle positions $P_1$ to $P_n$.

The vehicle position estimation process is repeatedly executed a finite number of times, until a certain condition is satisfied. For example, the amount of change $\Delta P$ between the object vehicle positions $P_1$ to $P_n$ estimated in the last cycle of the vehicle position estimation process and the object vehicle positions $P_1$ to $P_n$ estimated in the current cycle of the vehicle position estimation process is expressed by Equation (1) below. In Eq. (1), $\Delta P_i$ (i=1 to n) is the amount of change between the object vehicle position $P_i$ estimated in the last cycle of the vehicle position estimation process and the object vehicle position $P_i$ estimated in the current cycle of the vehicle position estimation process. The vehicle position estimation process is repeatedly executed, until the amount of change $\Delta P$ becomes smaller than a predetermined threshold value.

$$\Delta P = \sum_{i=1}^{n} (\Delta P_i)^2$$

The collection of the thus estimated object vehicle positions $P_1$ to $P_n$ at the respective times $t_1$ to $t_n$ provides "estimated traveling trajectory TRe".

2-2. Effect

As described above, according to this embodiment, the vehicle position estimation is performed based on the traveling record information TREC, so that the vehicle positions $P_1$ to $P_n$ at the respective times $t_1$ to $t_n$, namely, the estimated traveling trajectory TRe, is estimated. In the vehicle position estimation, not only the time $t_{k-1}$ previous to the object time $t_k$, but also the time $t_{k+1}$ subsequent to the object time $t_k$, is used as the reference time. Namely, the number of restriction conditions is increased, as compared with general localization. Accordingly, the accuracy in estimating the vehicle positions $P_1$ to $P_n$, or the estimated traveling trajectory TRe, is improved.

Also, according to this embodiment, the vehicle position estimation process can be repeatedly executed. Each time the vehicle position estimation process is executed, the vehicle positions $P_1$ to $P_n$ are updated, and the estimation accuracy is improved. Namely, with the vehicle position estimation process thus repeatedly executed, the accuracy in estimating the estimated traveling trajectory TRe can be further improved. As the number of restriction conditions increases, as described above, the vehicle positions $P_1$ to $P_n$ are more likely to converge.

Further, according to this embodiment, the vehicle position estimation can be performed as the times $t_1$ to $t_n$ are set in parallel as the object time $t_k$, as shown in FIG. 7. Namely, the vehicle positions $P_1$ to $P_n$ at the respective times $t_1$ to $t_n$ can be optimized via batch processing. With the total optimization, the efficiency of the vehicle position estimation process is further improved, and the accuracy in estimating the vehicle positions $P_1$ to $P_n$ is further improved.

Thus, according to this embodiment, the estimated traveling trajectory TRe that reproduces the actual traveling trajectory TRa with high accuracy can be efficiently obtained.

2-3. Estimation of Calibration Parameter

As described above, the calibration parameter E indicates the installation position and installation direction of the external sensor 22 in the vehicle coordination system. When the external sensor 22 is mounted on the vehicle 1, the calibration parameter E is uniquely determined. In the above localization, a given set value that is registered in advance is used as the calibration parameter E.

Figure 8:
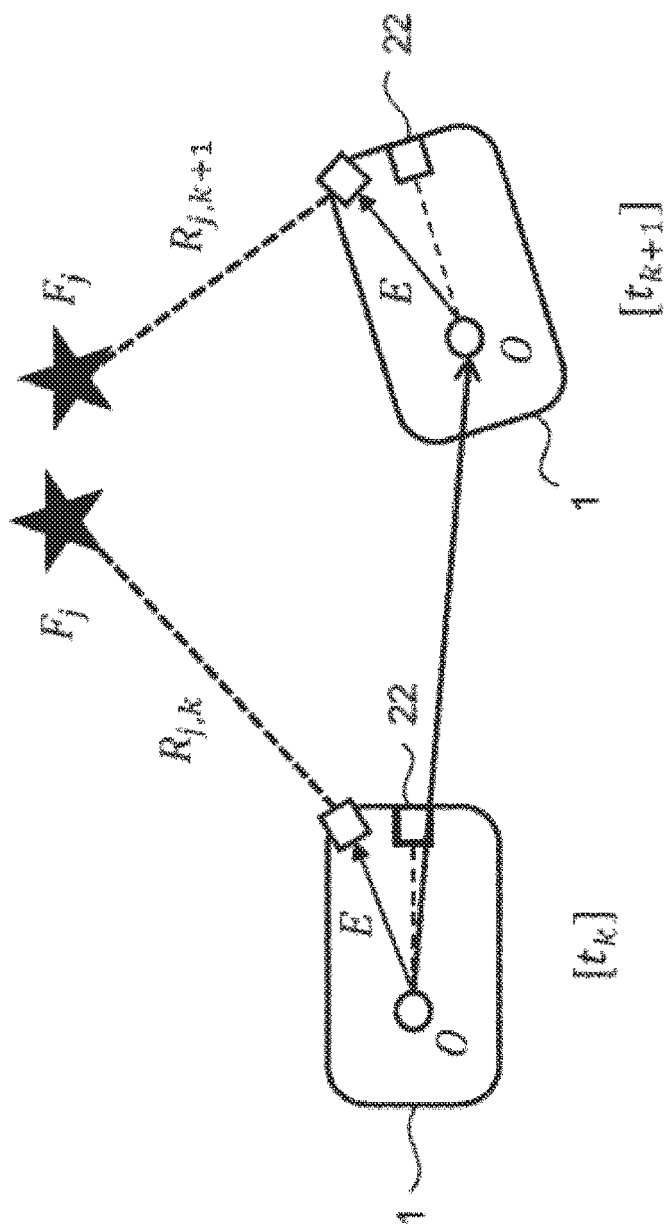
FIG. 8 is a schematic view useful for describing an abnormality of a calibration parameter according to the embodiment of the disclosure.

However, axis displacement, or the like, may arise in the external sensor 22, after the external sensor 22 is mounted on the vehicle 1. When the axis displacement, or the like, arises in the external sensor 22, the actual calibration parameter E deviates from the given set value. In other words, the set value of the calibration parameter E does not reflect the actual status any longer. In this case, even where the same characteristic object j is recognized by the external sensor 22 at different times, the same characteristic object j looks as if it exists at different absolute positions, as shown in FIG. 8. This results in reduction of the accuracy of the external estimated vehicle position $PO_{j,k}$, and consequently, reduction of the accuracy of the localization.

With the vehicle position estimation according to this embodiment, the latest calibration parameter E can be estimated. More specifically, in the vehicle position estimation, the calibration parameter E is treated as one variable, rather than a given set value. Then, the calibration parameter E is optimized (estimated) at the same time that the object vehicle positions $P_1$ to $P_n$ are optimized. Each time the vehicle position estimation process is executed, the accuracy in estimation of the calibration parameter E, as well as the vehicle positions $P_1$ to $P_n$, is improved.

When the given set value of the calibration parameter E deviates from the actual value, the accuracy in estimation of the vehicle positions $P_1$ to $P_n$ is reduced if the given set value is used as it is. On the other hand, when the calibration parameter E is set as a variable, and the calibration parameter E is estimated, along with the vehicle positions $P_1$ to $P_n$, the accuracy in estimation of the vehicle positions $P_1$ to $P_n$ is further improved.

It is also possible to detect an abnormality in the calibration parameter E, namely, detect axis displacement of the external sensor 22, by comparing the estimated value of the calibration parameter E with a given set value. It is also possible to recover accuracy of the localization, by eliminating the axial displacement of the external sensor 22, or updating the set value of the calibration parameter E to the latest estimated value.

In the following, the vehicle control system 10 and the traveling trajectory estimation system 100 according to this embodiment will be described in further detail.

3. Vehicle Control System 3-1. Configuration Example

Figure 9:
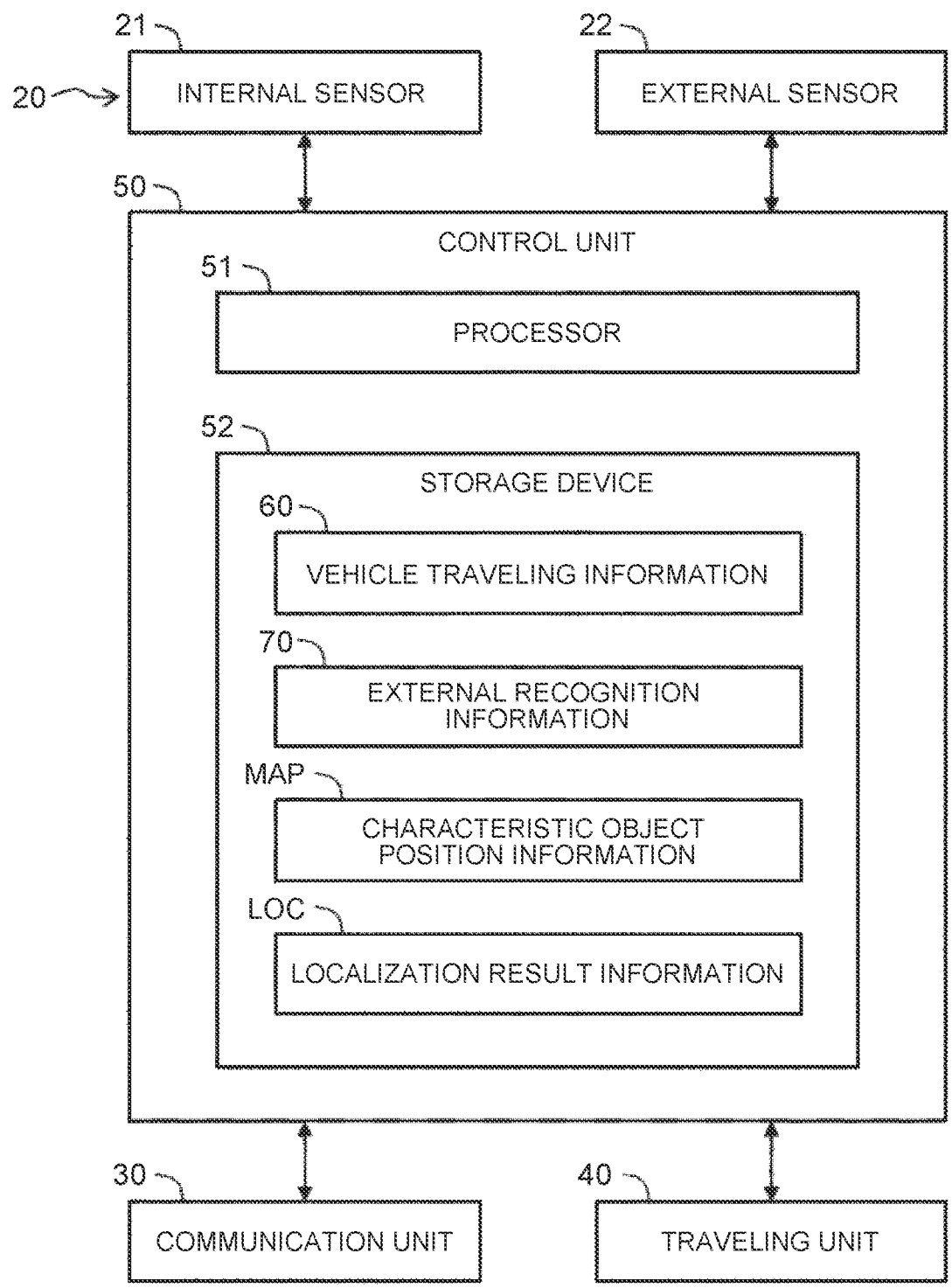
FIG. 9 is a block diagram showing an example of the configuration of the vehicle control system according to the embodiment of the disclosure.

FIG. 9 is a block diagram showing an example of the configuration of the vehicle control system 10 according to this embodiment. The vehicle control system 10 includes sensors 20, a communication unit 30, a traveling unit 40, and a control unit 50.

The sensors 20 include internal sensors 21 and external sensors 22. The internal sensors 21 detect traveling conditions or position of the vehicle 1. Examples of the internal sensors 21 include a wheel speed sensor, steering angle sensor, acceleration sensor, yaw rate sensor, GPS sensor, and so forth. The external sensors 22 recognize the environment of the vehicle 1. Examples of the external sensors 22 include LIDAR, cameras, radar, and so forth.

The communication unit 30 performs communications with the outside of the vehicle control system 10. For example, the communication unit 30 communicates with the traveling trajectory estimation system 100. The communications may be wired communications or wireless communications.

The traveling unit 40 includes a steering device, drive device, and braking device. The steering device turns the vehicle wheels. For example, the steering device includes an electric power steering (EPS) device. The drive device is a power source that generates drive power. Examples of the drive device include an engine, electric motor, in-wheel motor, and so forth. The braking device generates braking force.

The control unit 50 controls the vehicle 1. The control unit 50 includes one or more processors 51 (which will be simply called "processor 51"), and one or more storage devices 52 (which will be simply called "storage device 52"). The processor 51 performs various operations. For example, the processor 51 includes a central processing unit (CPU). The storage device 52 stores various kinds of information. Examples of the storage device 52 include a volatile memory, non-volatile memory, hard disk drive (HDD), solid state drive (SSD), and so forth. The processor 51 (the control unit 50) executes control programs as computer programs, so as to perform various operations. The control programs are stored in the storage device 52, or recorded in a computer-readable recording medium. The control unit 50 may include one or more electronic control units (ECU). A part of the control unit 50 may be an information processing unit outside the vehicle 1. In this case, that part of the control unit 50 communicates with the vehicle 1, and remotely controls the vehicle 1.

The storage device 52 stores vehicle traveling information 60, external recognition information 70, characteristic object position information MAP, and so forth.

The vehicle traveling information 60 is information detected by the internal sensors 21, and includes the traveling conditions or position of the vehicle 1. Examples of the traveling conditions of the vehicle 1 include the wheel speed, steering angle, acceleration, yaw rate, and so forth. Also, the position of the vehicle 1 is a rough vehicle position obtained by the GPS sensor.

The external recognition information 70 is information recognized by the external sensors 22. The external recognition information 70 includes object information concerning an object or objects around the vehicle 1. Examples of the object around the vehicle 1 include a pedestrian, other vehicle (e.g., a preceding vehicle, a parked vehicle, etc.), characteristic object j, and so forth. In particular, the external recognition information 70 includes object information concerning a characteristic object j recognized by the external sensor 22. The object information concerning the characteristic object j may include the relative position $R_{j,k}$ of the characteristic object j relative to the external sensor 22.

The characteristic object position information MAP indicates the installation position (absolute position $F_j$) of a characteristic object j in the absolute coordinate system. Typically, the characteristic object j is a stationary object. Examples of the characteristic object j include a white lane, pole, utility pole, road sign, signboard, etc. The characteristic object position information MAP is produced in advance. The characteristic object position information MAP may be included in map information. The processor 51 obtains map information of a necessary area, from a map database. The map database may be stored in a certain storage device installed on the vehicle 1, or may be stored in a management server outside the vehicle 1.

3-2. Localization

During traveling of the vehicle 1, the processor 51 performs localization to estimate the vehicle position P. More specifically, the processor 51 performs localization, based on the vehicle traveling information 60, external recognition information 70, and characteristic object position information MAP (see FIG. 2 to FIG. 4). Localization result information LOC indicates the vehicle position P estimated by the localization. The localization result information LOC is stored in the storage device 52.

3-3. Communication

The processor 51 communicates with the traveling trajectory estimation system 100, via the communication unit 30. For example, the communication unit 30 sends the vehicle traveling information 60 and external recognition information 70 to the traveling trajectory estimation system 100. The communication unit 30 may also send the localization result information LOC to the traveling trajectory estimation system 100. The transmission of the information to the traveling trajectory estimation system 100 may be performed in real time during traveling of the vehicle 1, or may be performed during stand-by of the vehicle 1.

3-4. Vehicle Traveling Control

The processor 51 performs vehicle traveling control to control traveling of the vehicle 1. The vehicle traveling control includes steering control, acceleration control, and deceleration control. The processor 51 controls the traveling unit 40 (the steering device, drive device, braking device), to perform vehicle traveling control.

Examples of the vehicle traveling control include automatic driving control, driving assistance control, and so forth. The automatic driving control is to control automatic driving of the vehicle 1. Examples of the driving assistance control include risk avoidance control, lane keep assist (LKA) control, and so forth. As the risk avoidance control, at least one of the steering control and speed reduction control is performed so as to reduce a risk of collision between the vehicle 1 and an object. The lane keep assist control is performed so as to cause the vehicle 1 to travel along a driving lane.

Typically, the processor 51 produces a target trajectory TRt of the vehicle 1. The target trajectory TRt is produced, based on the map information, localization result information LOC (vehicle position), external recognition information 70 (object information), and so forth. For example, the target trajectory TRt that extends along the center of the lane is produced. The target trajectory TRt is a collection of target positions of the vehicle 1. A target velocity may be set for each target position. The processor 51 performs vehicle traveling control (trajectory following control) so that the vehicle 1 follows the target trajectory TRt.

4. Traveling Trajectory Estimation System

4-1. Configuration Example

Figure 10:
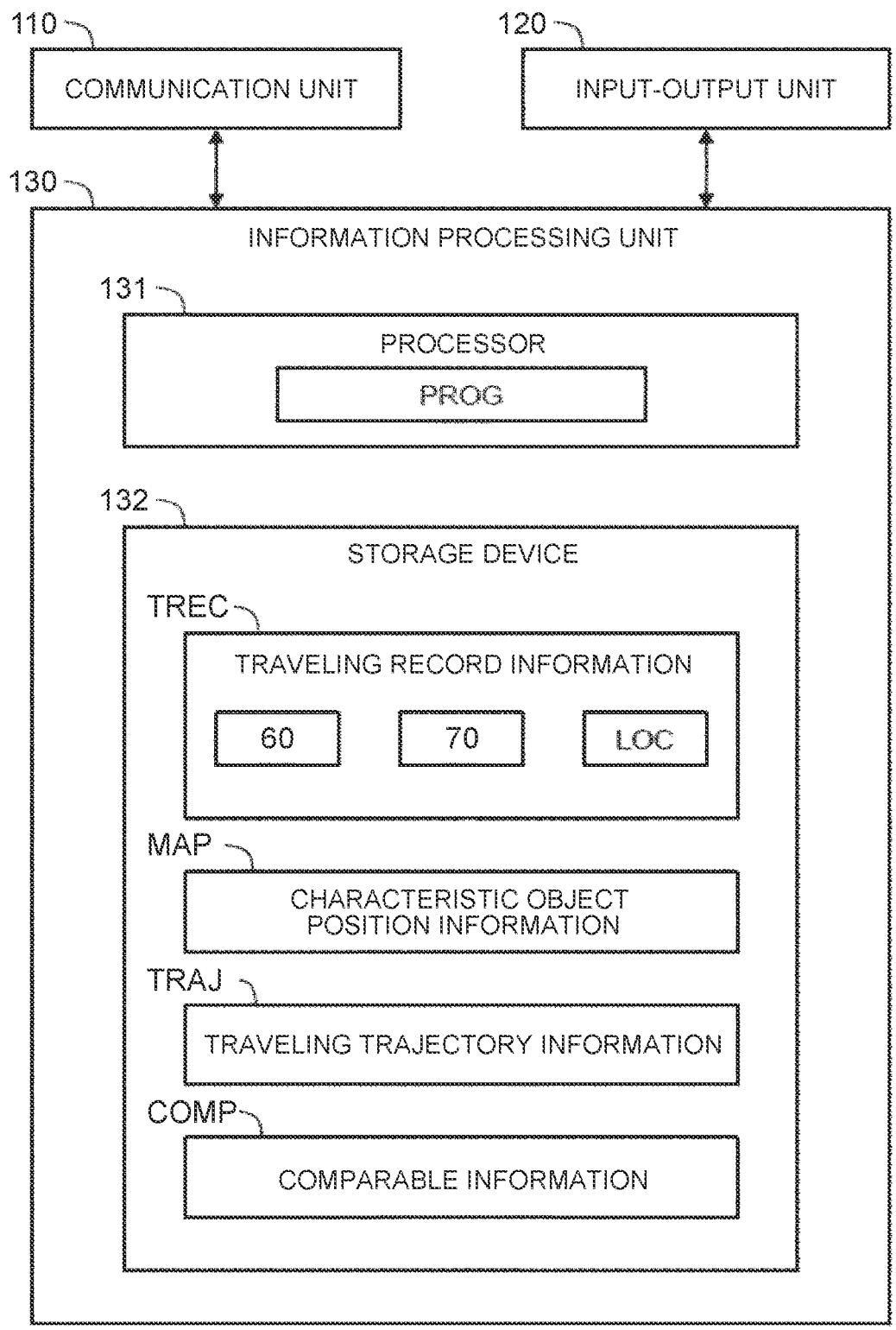
FIG. 10 is a block diagram showing an example of the configuration of the traveling trajectory estimation system according to the embodiment of the disclosure.

FIG. 10 is a block diagram showing an example of the configuration of the traveling trajectory estimation system 100 according to this embodiment. The traveling trajectory estimation system 100 includes a communication unit 110, input-output unit 120, and information processing unit 130.

The communication unit 110 communicates with the outside. For example, the communication unit 110 communicates with the vehicle control system 10 of the vehicle 1. The communications may be wired communications, or wireless communications.

The input-output unit 120 is an interface that receives information from an operator of the traveling trajectory estimation system 100, or provides information to the operator. Examples of its input device include a keyboard, mouse, touch panel, and so forth. Examples of its output device include a display device, speaker, and so forth.

The information processing unit 130 performs various information processing. The information processing unit 130 includes one or more processors 131 (which will be simply called "processor 131") and one or more storage device 132 (which will be simply called "storage device 132"). The processor 131 performs various operations. For example, the processor 131 includes a CPU. The storage device 132 stores various kinds of information. Examples of the storage device 132 include a volatile storage device, non-volatile storage device, HDD, SSD, and so forth. The processor 131 executes a "traveling trajectory estimation program PROG" as a computer program, to fulfill the function of the information processing unit 130. The traveling trajectory estimation program PROG is stored in the storage device 132. The traveling trajectory estimation program PROG may be stored in a computer-readable recording medium. The traveling trajectory estimation program PROG may be provided via a network.

The storage device 132 stores traveling record information TREC, characteristic object position information MAP, traveling trajectory information TRAJ, comparable information COMP, and so forth.

The traveling record information TREC indicates the past traveling record of the vehicle 1. The traveling record information TREC includes the above-mentioned vehicle traveling information 60 and external recognition information 70 obtained during traveling of the vehicle 1. The traveling record information TREC may further include the localization result information LOC. The processor 131 receives the traveling record information TREC from the vehicle control system 10, via the communication unit 110. Transmission of the traveling record information TREC from the vehicle control system 10 to the traveling trajectory estimation system 100 may be performed in real time during traveling of the vehicle 1, or may be performed during stand-by of the vehicle 1.

The characteristic object position information MAP indicates the installation position (the absolute position $F_j$) of a characteristic object j in the absolute coordinate system. The characteristic object position information MAP is similar to the one used in the localization by the vehicle control system 10.

The traveling trajectory information TRAJ indicates the estimated traveling trajectory TRe estimated by the traveling trajectory estimation process. The estimated traveling trajectory TRe reproduces the actual traveling trajectory TRa with high accuracy.

The comparable information COMP is used in a traveling trajectory evaluation process that will be described later. Examples of the comparable information COMP will be described later.

4-2. Processing by Traveling Trajectory Estimation System

Figure 11:
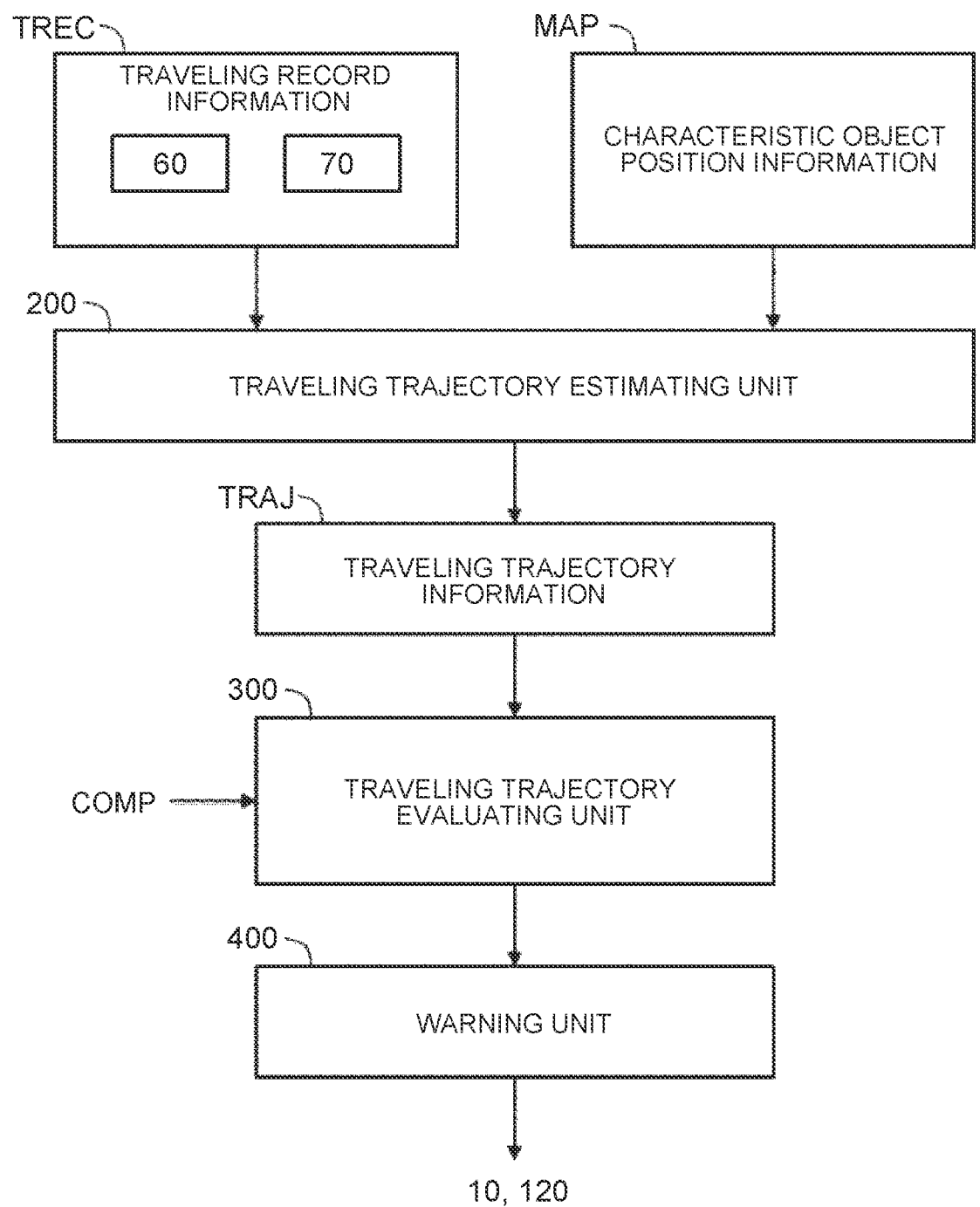
FIG. 11 is a block diagram useful for describing the traveling trajectory estimation system according to the embodiment of the disclosure.

FIG. 11 is a block diagram useful for describing processing performed by the traveling trajectory estimation system 100 (the processor 131) according to this embodiment. The traveling trajectory estimation system 100 includes a traveling trajectory estimating unit 200, traveling trajectory evaluating unit 300, and warning unit 400, as function blocks. The processor 131 executes the traveling trajectory estimation program PROG, to implement these function blocks.

Figure 12:
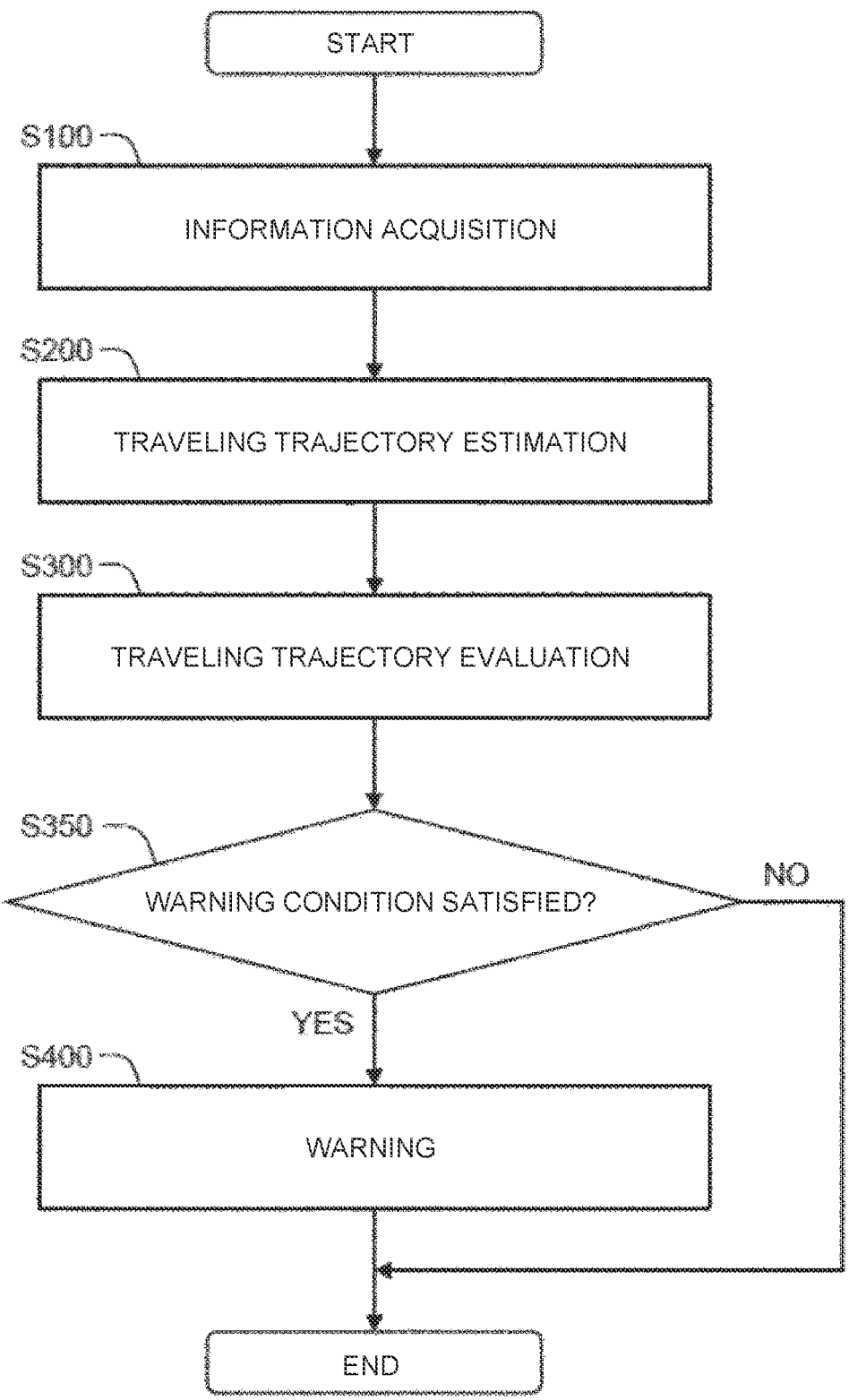
FIG. 12 is a flowchart illustrating processing performed by the traveling trajectory estimation system according to the embodiment of the disclosure.

FIG. 12 is a flowchart illustrating processing performed by the traveling trajectory estimation system 100 (the processor 131) according to this embodiment.

4-2-1. Information Acquisition (Step S100)

In step S100, the traveling trajectory estimating unit 200 acquires the traveling record information TREC and the characteristic object position information MAP.

4-2-2. Traveling Trajectory Estimation (Step S200)

In step S200, the traveling trajectory estimating unit 200 performs a traveling trajectory estimation process to estimate the traveling trajectory of the vehicle 1. More specifically, the traveling trajectory estimating unit 200 performs the traveling trajectory estimation process based on the traveling record information TREC and the characteristic object position information MAP. The traveling trajectory information TRAJ indicates the estimated traveling trajectory TRe estimated by the traveling trajectory estimation process.

Figure 13:
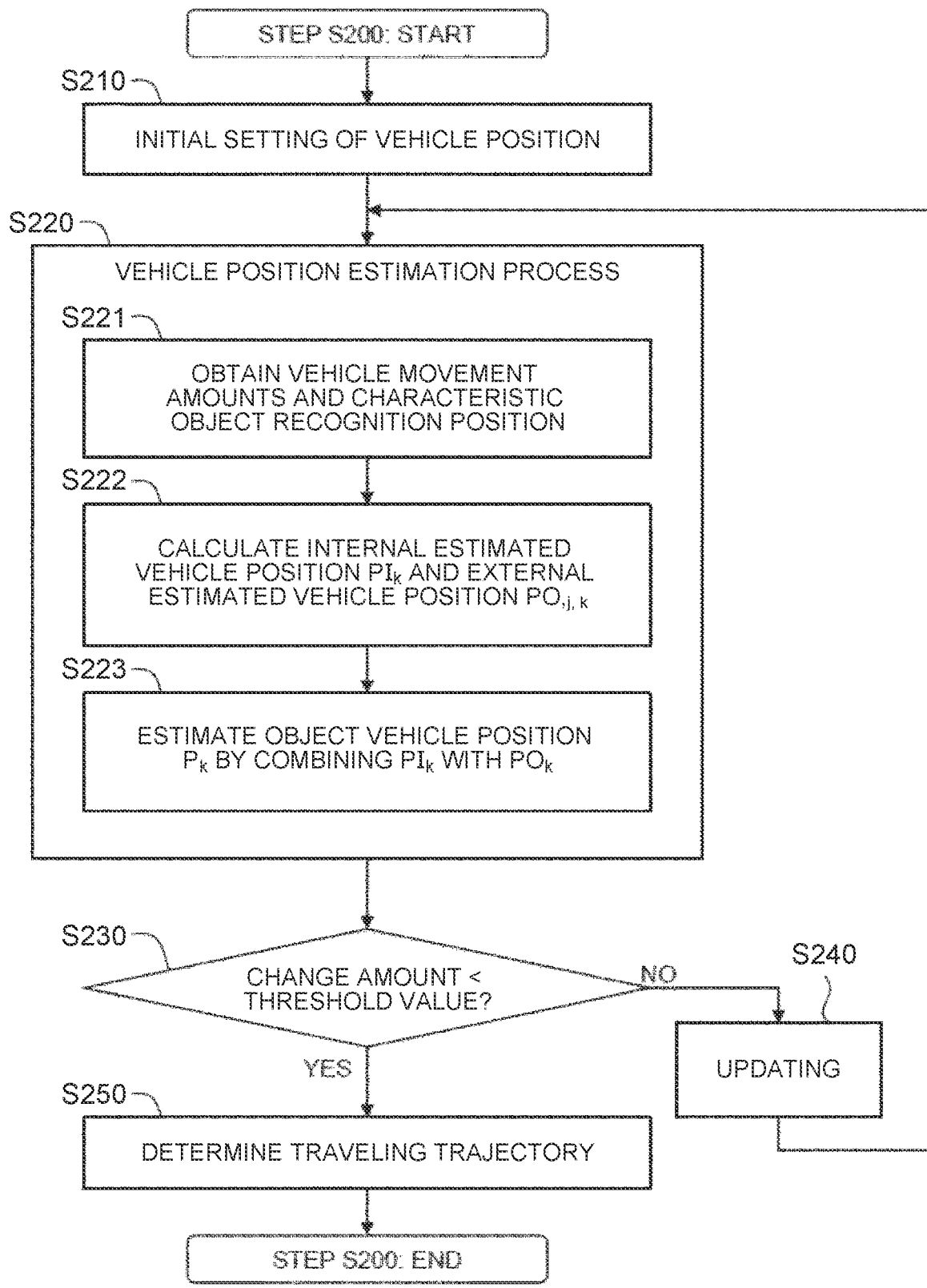
FIG. 13 is a flowchart illustrating a traveling trajectory estimation process (step S200) according to the embodiment of the disclosure.

FIG. 13 is a flowchart illustrating the traveling trajectory estimation process (step S200) according to this embodiment.

In step S210, the traveling trajectory estimating unit 200 initially sets the vehicle positions $P_1$ to $P_n$ at a plurality of times $t_1$ to $t_n$, respectively. More specifically, the traveling trajectory estimating unit 200 sets the initial values of the vehicle positions $P_1$ to $P_n$, based on the vehicle traveling information 60 included in the traveling record information TREC. For example, rough vehicle positions $P_1$ to $P_n$ detected by the GPS sensor are set as the initial values. In another example, the initial values of the vehicle positions $P_1$ to $P_n$ may be set, by adding the vehicle movement amounts $T_{1,2}$ to $T_{n-1,n}$ to the vehicle position $P_1$ detected by the GPS sensor. Another vehicle position $P_x$ may be used as the point of origin, in place of the vehicle position $P_1$.

In step S220, the traveling trajectory estimating unit 200 performs the vehicle position estimation process to estimate the vehicle positions $P_1$ to $P_n$, based on the traveling record information TREC and the characteristic object position information MAP (see FIG. 5 to FIG. 7).

More specifically, in step S221, the traveling trajectory estimating unit 200 obtains the first vehicle movement amount $T_{k-1, k}$ and the second vehicle movement amount $T_{k, k+1}$, based on the vehicle traveling information 60 included in the traveling record information TREC. Also, the traveling trajectory estimating unit 200 obtains the relative position $R_{j, k}$ of a characteristic object j recognized at the object time $t_k$, based on the external recognition information 70 included in the traveling record information TREC.

In step S222, the traveling trajectory estimating unit 200 calculates the internal estimated vehicle position $PI_k$, based on the first reference vehicle position $P_{k-1}$, the first vehicle movement amount $T_{k-1, k}$, the second reference vehicle position $P_{k+1}$, and the second vehicle movement amount $T_{k, k+1}$. Also, the traveling trajectory estimating unit 200 calculates the external estimated vehicle position $PO_{j, k}$, based on the absolute position $F_j$ of the characteristic object j indicated in the characteristic object position information MAP, the relative position $R_{j, k}$ of the characteristic object j, and the calibration parameter E.

In step S223, the traveling trajectory estimating unit 200 estimates the object vehicle position $P_k$ at the object time $t_k$, by combining the internal estimated vehicle position $PI_k$, with the external estimated vehicle position $PO_{j, k}$ regarding one or more characteristic objects j. At this time, the traveling trajectory estimating unit 200 may set a plurality of times $t_1$ to $t_n$ in parallel as the object time $t_k$, and estimate (optimize) a plurality of object vehicle positions $P_1$ to $P_n$ at the respective times $t_1$ to $t_n$ via batch processing (see FIG. 7). Also, the traveling trajectory estimating unit 200 may set the calibration parameter E as a variable, and estimate the calibration parameter E along with the object vehicle positions $P_1$ to $P_n$ (see the above section 2-3).

In step S230, the traveling trajectory estimating unit 200 calculates the amount of change ΔP between the object vehicle positions $P_1$ to $P_n$ estimated in the last cycle of the vehicle position estimation process, and the object vehicle positions $P_1$ to $P_n$ estimated in the current cycle of the vehicle position estimation process. The amount of change ΔP is represented by Eq. (1) above, for example. Then, the traveling trajectory estimating unit 200 compares the amount of change ΔP with a given threshold value.

When the amount of change ΔP is equal to or larger than the given threshold value (step S230; No), the control proceeds to step S240. In step S240, the vehicle positions $P_1$ to $P_n$ are updated. Namely, the object vehicle positions $P_1$ to $P_n$ estimated in step S220 of the current cycle are set as the latest vehicle positions $P_1$ to $P_n$ (the first reference vehicle position $P_{k-1}$ and the second reference vehicle position $P_{k+1}$). Then, the control returns to step S220 (the vehicle position estimation process).

The vehicle position estimation process is repeatedly executed, until the amount of change ΔP becomes smaller than the given threshold value. When the amount of change ΔP becomes smaller than the given threshold value (step S230; YES), the control proceeds to step S250. In step S250, the traveling trajectory estimating unit 200 determines the collection of the estimated object vehicle positions $P_1$ to $P_n$ as the estimated traveling trajectory TRe. The traveling trajectory information TRAJ indicates the estimated traveling trajectory TRe.

4-2-3. Traveling Trajectory Evaluation (Step S300)

In step S300, the traveling trajectory evaluating unit 300 performs a "traveling trajectory evaluation process" to evaluate the estimated traveling trajectory TRe indicated by the traveling trajectory information TRAJ. Here, the traveling trajectory evaluating unit 300 uses the comparable information COMP as needed. Various examples of the traveling trajectory evaluation process will be described later.

In step S350, the traveling trajectory evaluating unit 300 determines whether the result of the traveling trajectory evaluation satisfies a warning condition. Various examples of the warning condition will be described later. When the result of the traveling trajectory evaluation does not satisfy the warning condition (step S350; No), the current cycle ends. On the other hand, when the result of the traveling trajectory evaluation satisfies the warning condition (step S350; Yes), the control proceeds to step S400.

4-2-4. Warning (Step S400)

In step S400, the warning unit 400 generates a warning. For example, the warning unit 400 generates a warning to the operator of the traveling trajectory estimation system 100, using the output device of the input-output unit 120. In another example, the warning unit 400 communicates with the vehicle control system 10 via the communication unit 110, and generates a warning to the user of the vehicle 1, via the vehicle control system 10.

Various examples of the content of the warning may be considered. For example, the warning indicates the content of an abnormality detected in the traveling trajectory evaluation process. In another example, the warning may request a temporary stop of automatic driving of the vehicle 1. In a further example, the warning may request inspection of the sensors 20, etc. of the vehicle 1.

4-3. Various Examples of Traveling Trajectory Evaluation

Various examples of the traveling trajectory evaluation according to the embodiment will be described.

4-3-1. First Example

In a first example, the traveling trajectory evaluating unit 300 determines whether the estimated traveling trajectory TRe includes "meandering". Here, meandering means that the estimated traveling trajectory TRe meanders, even though the driving lane on which the vehicle 1 travels does not meander. The shape of the lane on which the vehicle 1 travels is obtained from the map information. The comparable information COMP includes the lane shape indicated by the map information. The warning condition is that "the estimated traveling trajectory TRe includes meandering".

4-3-2. Second Example

In a second example, the traveling trajectory evaluating unit 300 determines whether the estimated traveling trajectory TRe includes an "abnormal curvature". Here, the abnormal curvature means the curvature of the estimated traveling trajectory TRe that exceeds a given curvature threshold value. The comparable information COMP includes the given curvature threshold value. The warning condition is that "the estimated traveling trajectory TRe includes an abnormal curvature".

4-3-3. Third Example

Figure 14:
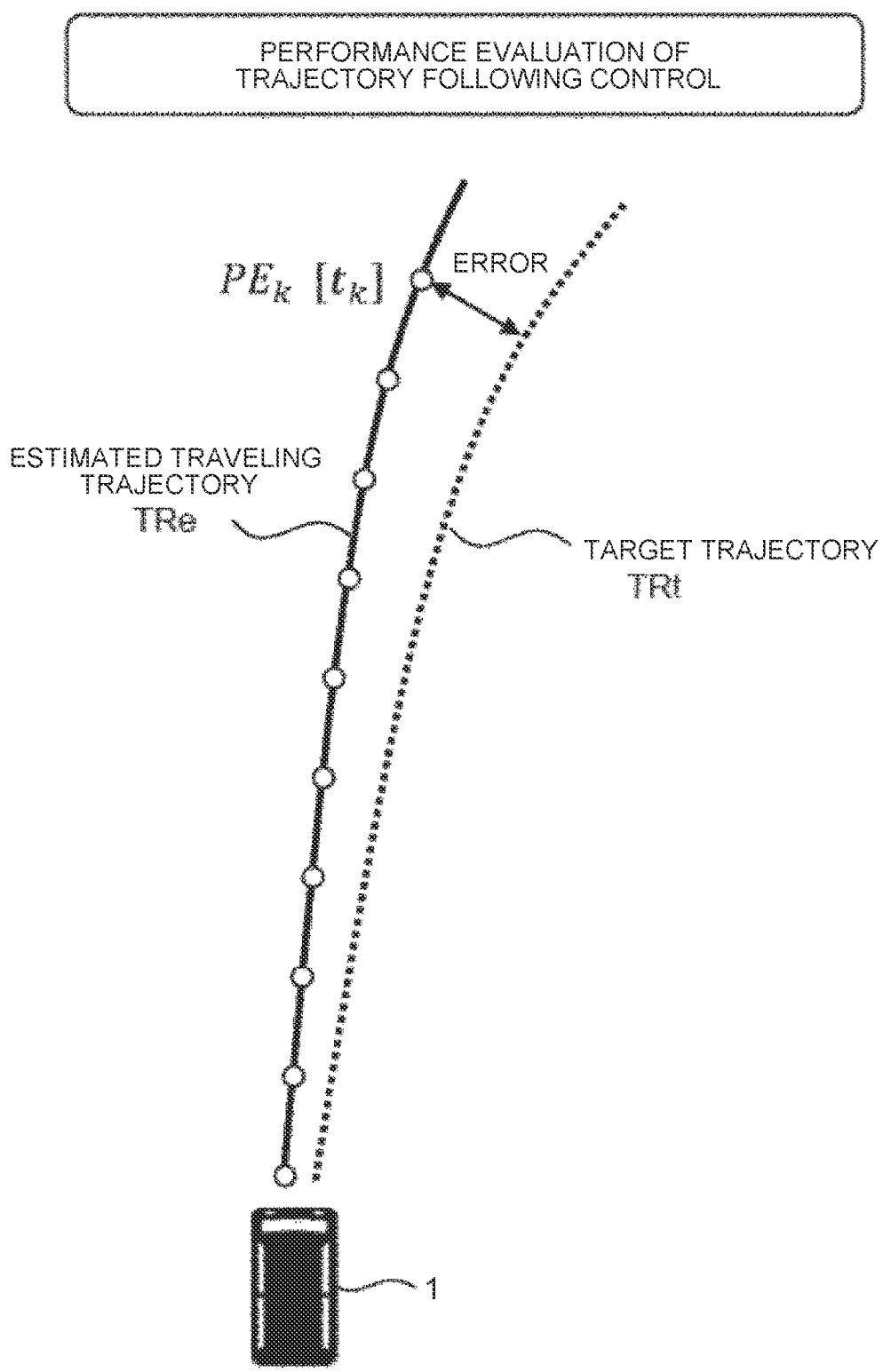
FIG. 14 is a schematic view useful for describing a third example of a traveling trajectory evaluation process (step S300) according to the embodiment of the disclosure.

FIG. 14 is a schematic view useful for describing a third example of the traveling trajectory evaluation (step S300). In the third example, the traveling trajectory evaluating unit 300 evaluates the performance (accuracy) of the trajectory following control performed by the vehicle control system 10.

More specifically, the traveling trajectory evaluating unit 300 calculates an error between the estimated traveling trajectory TRe and the target trajectory TRt (an ideal path). Namely, the comparable information COMP includes the target trajectory TRt (ideal path). The error between the estimated traveling trajectory TRe and the target trajectory TRt is, for example, the shortest distance between the estimated vehicle position $PE_k$ and the target trajectory TRt. The estimated vehicle position $PE_k$ is the vehicle position $P_k$ at time $t_k$ estimated by the traveling trajectory evaluation process, and is obtained from the traveling trajectory information TRAJ.

The warning condition is that the error between the estimated traveling trajectory TRe and the target trajectory TRt exceeds a given threshold value.

Figure 15:
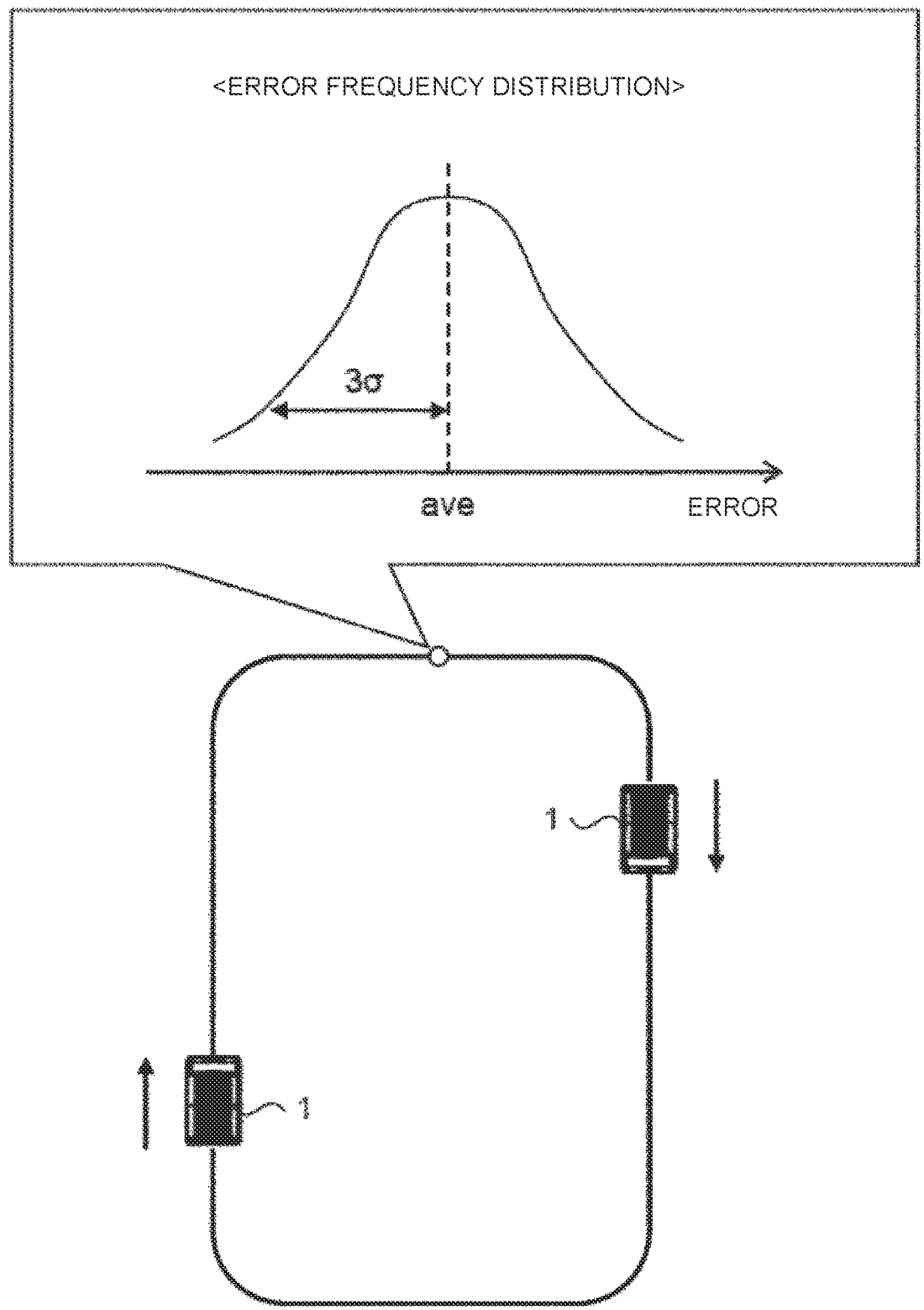
FIG. 15 is a schematic view useful for describing an example of a determination process (step S350) according to the embodiment of the disclosure.

In another example, the past statistical information may be taken into consideration. For example, FIG. 15 shows the case where the vehicle 1 travels on a predetermined loop course. Errors between the estimated traveling trajectory TRe and the target trajectory TRt are accumulated for each position on the loop course. Typically, errors in a period in which the trajectory following control is normal are accumulated for each position on the loop course. An error average value ave is an average value in the distribution of the accumulated errors, and is calculated for each position on the loop course.

For example, the traveling trajectory evaluating unit 300 compares an error between the estimated traveling trajectory TRe estimated in this cycle and the target trajectory TRt, with the error average value ave, for each position. The warning condition is that "positions at which the error of this cycle deviates from the error average value ave by a certain value or larger account for a certain percentage or more of the loop course". As the above-indicated certain value, 3σ of the distribution of the accumulated errors may be used.

In another example, an "overall error average value ave_t" obtained by averaging the error average value ave for each position over the entire length of loop course may be used. In this case, the traveling trajectory evaluating unit 300 obtains an average value of errors associated with the estimated traveling trajectory TRe estimated in this cycle, over the entire length of the loop course. The warning condition is that "the average value of the errors in this cycle deviates from the overall error average value ave_t by a certain value or larger".

Reduction of the performance of the trajectory following control is caused by malfunction of the traveling unit 40 (in particular, the steering device), and/or reduction of the accuracy in the localization. When a warning is generated, the operator or the user of the vehicle 1 may consider inspection of the traveling unit 40 or the sensors 20.

4-3-4. Fourth Example

Figure 16:
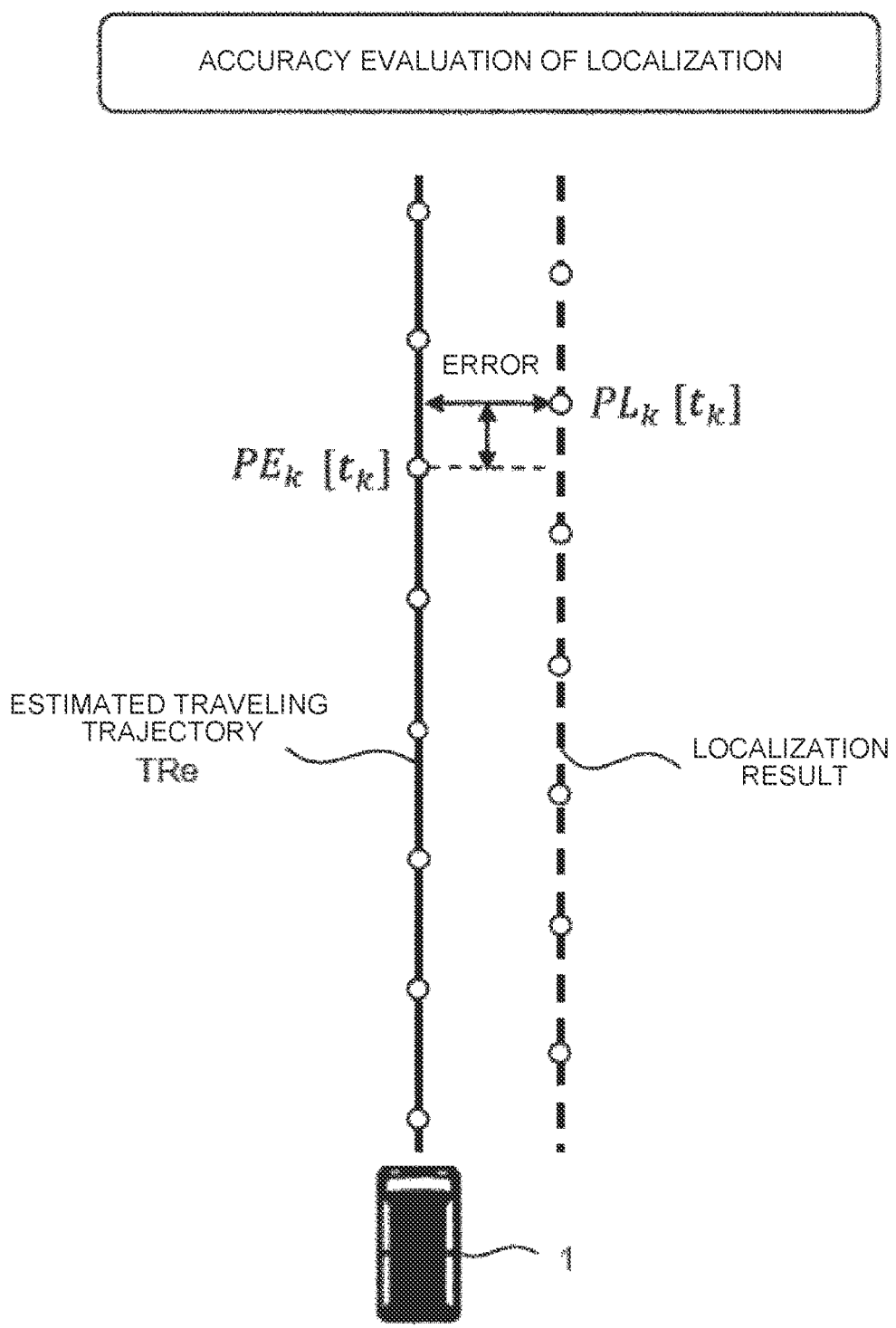
FIG. 16 is a schematic view useful for describing a fourth example of the traveling trajectory evaluation process (step S300) according to the embodiment of the disclosure.

FIG. 16 is a schematic view useful for describing a fourth example of the traveling trajectory evaluation (step S300). In the fourth example, the traveling trajectory evaluating unit 300 evaluates the accuracy of the localization performed by the vehicle control system 10.

More specifically, the traveling trajectory evaluating unit 300 compares the estimated traveling trajectory TRe with the vehicle positions estimated by the localization. Namely, the comparable information COMP includes the localization result information LOC. The localization result position $PL_k$ is the vehicle position $P_k$ at time $t_k$ estimated by the localization during traveling of the vehicle 1, and is obtained from the localization result information LOC. On the other hand, the estimated vehicle position $PE_k$ is the vehicle position $P_k$ at time $t_k$ estimated by the traveling trajectory estimation, and is obtained from the traveling trajectory information TRAJ. The traveling trajectory evaluating unit 300 calculates error between the estimated vehicle position $PE_k$ and the localization result position $PL_k$. As shown in FIG. 16, the error between the estimated vehicle position $PE_k$ and the localization result position $PL_k$ includes a vertical error and a lateral error.

The warning condition is, for example, that at least one of the vertical error and lateral error between the estimated vehicle position $PE_k$ and the localization result position $PL_k$ exceeds a given threshold value.

In another example, the past statistical information as shown in FIG. 15 may be taken into consideration. In this case, the statistical information is accumulated with respect to each of the vertical error and the lateral error. The warning condition based on the statistical information is similar to that described above in the third example.

Reduction of the accuracy of the localization is caused by an abnormality in any of the sensors 20 (the internal sensors 21, the external sensors 22), and/or malfunction of the localization algorithm. When the warning is generated, the operator or the user of the vehicle 1 may consider inspection of the sensors 20 or updating of the localization algorithm.

4-3-5. Fifth Example

Figure 17:
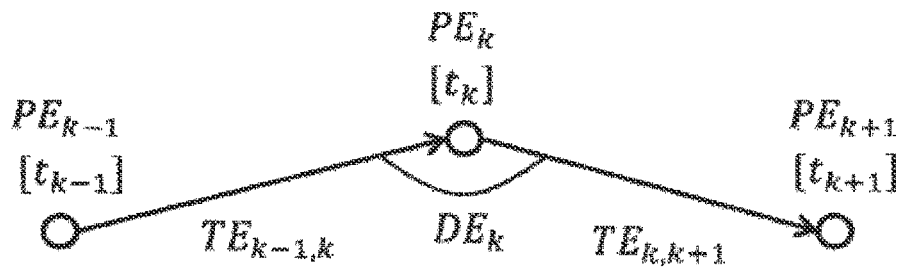
FIG. 17 is a schematic view useful for describing a fifth example of the traveling trajectory evaluation process (step S300) according to the embodiment of the disclosure.

FIG. 17 is a schematic view useful for describing a fifth example of the traveling trajectory evaluation (step S300). In the fifth example, the traveling trajectory evaluating unit 300 evaluates the accuracy of the internal sensors 21.

More specifically, the traveling trajectory evaluating unit 300 calculates a plurality of vehicle positions $P_1$ to $P_n$ at a plurality of times $t_1$ to $t_n$, solely based on the vehicle traveling information 60, without using the external recognition information 70. The vehicle positions $P_1$ to $P_n$ calculated solely based on the vehicle traveling information 60 will be called "comparable vehicle positions $PC_1$ to $PC_n$", for the sake of convenience. The comparable vehicle positions $PC_1$ to $PC_n$ are equivalent to the initial values of the vehicle positions $P_1$ to $P_n$ in the traveling trajectory estimation process. For example, the comparable vehicle positions $PC_1$ to $PC_n$ are rough vehicle positions detected by the GPS sensor. In another example, the comparable vehicle positions $PC_1$ to $PC_n$ may be calculated, by adding the vehicle movement amounts $T_{1,2}$ to $T_{n-1,n}$ to the vehicle position $P_1$ detected by the GPS sensor. Another vehicle position $P_x$ may be used as the point of origin, in place of the vehicle position $P_1$.

Then, the traveling trajectory evaluating unit 300 compares the estimated traveling trajectory TRe with the comparable vehicle positions $PC_1$ to $PC_n$. Namely, the comparable information COMP includes the comparable vehicle positions $PC_1$ to $PC_n$ calculated from the vehicle traveling information 60. The estimated vehicle position $PE_k$ is a vehicle position $P_k$ at time $t_k$ estimated by the traveling trajectory estimation process, and is obtained from the traveling trajectory information TRAJ. The traveling trajectory evaluating unit 300 calculates an error between the estimated vehicle position $PE_k$ and the comparable vehicle position $PC_k$.

As shown in FIG. 17, the error between the estimated vehicle position $PE_k$ and the comparable vehicle position $PC_k$ may be specified by "vehicle movement amount error" and "angle error". The estimated vehicle movement amount $TE_{k-1,k}$ is a vehicle movement amount between the estimated vehicle position $PE_{k-1}$ and the estimated vehicle position $PE_k$. The estimated vehicle movement amount $TE_{k,k+1}$ is a vehicle movement amount between the estimated vehicle position $PE_k$ and the estimated vehicle position $PE_{k+1}$. The estimated angle $DE_k$ is an angle between a vector representing the estimated vehicle movement amount $TE_{k-1,k}$ and a vector representing the estimated vehicle movement amount $TE_{k,k+1}$. On the other hand, the comparable vehicle movement amount $TC_{k-1,k}$ is a vehicle movement amount between the comparable vehicle position $PC_{k-1}$ and the comparable vehicle position $PC_k$. The comparable vehicle movement amount $TC_{k,k+1}$ is a vehicle movement amount between the comparable vehicle position $PC_k$ and the comparable vehicle position $PC_{k+1}$. The comparable angle $DC_k$ is an angle between a vector representing the comparable vehicle movement amount $TC_{k-1,k}$ and a vector representing the comparable vehicle movement amount $TC_{k,k+1}$. The vehicle movement amount error includes an error between the estimated vehicle movement amount $TE_{k-1,k}$ and the comparable vehicle movement amount $TC_{k-1,k}$, and an error between the estimated vehicle movement amount $TE_{k,k+1}$ and the comparable vehicle movement amount $TC_{k,k+1}$. The angle error is an error between the estimated angle $DE_k$ and the comparable angle $DC_k$.

The warning condition is, for example, that the error between the estimated vehicle position $PE_k$ and the comparable vehicle position $PC_k$ exceeds a given threshold value. For example, the warning condition is that at least one of the vehicle movement amount error and the angle error exceeds a given threshold value.

In another example, the past statistical information as shown in FIG. 15 may be taken into consideration. In this case, the statistical information is accumulated with respect to each of the vehicle movement amount error and the angle error. The warning condition based on the statistical information is similar to that described above in the above third example.

When the warning is generated, the operator or the user of the vehicle 1 may determine that there is an abnormality in the internal sensors 21, and may consider inspection of the internal sensors 21.

4-3-6. Sixth Example

In a sixth example, the traveling trajectory evaluating unit 300 evaluates a calibration parameter E regarding an external sensor 22. To this end, the calibration parameter E is also estimated, in the above traveling trajectory estimation process (see section 2-3).

More specifically, the traveling trajectory evaluating unit 300 compares the estimated value of the calibration parameter E with a given set value. Namely, the comparable information COMP is the given set value of the calibration parameter E. The traveling trajectory evaluating unit 300 calculates an error between the estimated value of the calibration parameter E and the given set value. The warning condition is, for example, that the error between the estimated value of the calibration parameter E and the given set value exceeds a given threshold value.

When the warning is generated, the operator or the user of the vehicle 1 may determine that there is an abnormality in the calibration parameter E, and consider inspection of the installation state of the external sensor 22. When axis displacement arises in the external sensor 22, the installation state of the external sensor 22 can be corrected so as to eliminate the axis displacement. Alternatively, the set value of the calibration parameter E may be updated to the latest estimated value. Through these measures, it is possible to recover accuracy of the localization.

According to this embodiment, it is possible to estimate the traveling trajectory of the vehicle 1 with high accuracy, through the traveling trajectory estimation process based on the traveling record information TREC.

Also, according to this embodiment, it is possible to evaluate the performance of the trajectory following control, the accuracy of the localization, the accuracy of the sensors 20, and so forth, by analyzing the estimated traveling trajectory TRe. It is thus possible to detect an abnormality in the traveling unit 40 and the sensors 20. Here, it is to be noted that no special environment or special equipment is needed so as to detect an abnormality in the traveling unit 40 and the sensors 20. The method according to this embodiment may be said to be a versatile, and inexpensive method.

This embodiment may be applied to an autonomous driving vehicle. For example, this embodiment is applied to an automatically operated bus that travels along a loop course. In this case, the traveling trajectory of the automatically operated bus is automatically estimated and evaluated, before and after or during operation of the automatically operated bus. With this embodiment applied, it is possible to systematically detect an abnormality in the sensors 20 and the traveling unit 40 of the automatically operated bus.

What is claimed is:

1. A traveling trajectory estimation system, comprising:
a storage device that stores traveling record information indicating a past traveling record of a vehicle, and characteristic object position information indicating an installation position of a characteristic object; and
a processor configured to perform a traveling trajectory estimation process to estimate a traveling trajectory of the vehicle, based on the traveling record information and the characteristic object position information,
wherein the traveling record information includes vehicle traveling information including a traveling state or a position of the vehicle detected by an internal sensor installed on the vehicle, and external recognition information including information on the characteristic object recognized by an external sensor installed on the vehicle,
wherein the traveling trajectory estimation process includes a vehicle position estimation process for estimating a vehicle position as a position of the vehicle,
wherein an object vehicle position is the vehicle position at an object time,
wherein a first reference vehicle position is the vehicle position at a first reference time previous to the object time,
wherein a second reference vehicle position is the vehicle position at a second reference time subsequent to the object time,
wherein a first vehicle movement amount is a movement amount of the vehicle between the first reference time and the object time,
wherein a second vehicle movement amount is a movement amount of the vehicle between the second reference time and the object time,
wherein the vehicle position estimation process includes obtaining the first vehicle movement amount and the second vehicle movement amount, based on the vehicle traveling information,
obtaining a relative position of the characteristic object recognized at the object time, based on the external recognition information,
calculating the object vehicle position as an internal estimated vehicle position, based on the first reference vehicle position, the first vehicle movement amount, the second reference vehicle position, and the second vehicle movement amount,
calculating the object vehicle position as an external estimated vehicle position, based on the installation position of the characteristic object indicated by the characteristic object position information and the relative position of the characteristic object at the object time, and
estimating the object vehicle position by combining the internal estimated vehicle position with the external estimated vehicle position,
wherein the processor is configured to set each of a plurality of successive times as the object time, and perform the vehicle position estimation process, to estimate a plurality of object vehicle positions at the respective times, and determine a collection of the object vehicle positions estimated, as the traveling trajectory of the vehicle,
wherein the vehicle performs a localization process during traveling to estimate the vehicle position, based on the vehicle traveling information, the external recognition information, and the characteristic object position information,
wherein the processor is configured to calculate an error between the estimated traveling trajectory, and the vehicle position estimated by the localization process, and generate a warning to an operator of the traveling trajectory estimation system or a user of the vehicle, when the error satisfies a warning condition, and
wherein the processor is configured to control travel of the vehicle based on the estimated vehicle position.

2. The traveling trajectory estimation system according to claim 1, wherein the processor is configured to set the plurality of successive times in parallel as the object time, and perform the vehicle position estimation process, to estimate the object vehicle positions at the respective times via batch processing.

3. The traveling trajectory estimation system according to claim 2, wherein the processor is configured to repeatedly execute the vehicle position estimation process, by setting the object vehicle positions estimated in the last cycle of the vehicle position estimation process as the first reference vehicle position and the second reference vehicle position in a current cycle of the vehicle position estimation process.

4. The traveling trajectory estimation system according to claim 3, wherein the processor is configured to repeatedly execute the vehicle position estimation process, until an amount of change between the object vehicle positions estimated in the last cycle of the vehicle position estimation process and the object vehicle positions estimated in the current cycle of the vehicle position estimation process becomes smaller than a threshold value.

5. The traveling trajectory estimation system according to claim 1, wherein:
a calibration parameter indicates an installation position and an installation direction of the external sensor in a vehicle coordinate system fixed to the vehicle;
the processor is configured to calculate the external estimated vehicle position, based on the installation position of the characteristic object, the relative position of the characteristic object at the object time, and the calibration parameter; and in the vehicle position estimation process, the processor is configured to set the calibration parameter as a variable, and estimate the calibration parameter along with the object vehicle positions.

6. The traveling trajectory estimation system according to claim 5, wherein the processor is further configured to:
calculate an error between the calibration parameter estimated, and a set value of the calibration parameter; and
generate a waring to an operator of the traveling trajectory estimation system or a user of the vehicle, when the error satisfies a warning condition.

7. The traveling trajectory estimation system according to claim 1, wherein the processor is further configured to generate a warning to an operator of the traveling trajectory estimation system or a user of the vehicle, when the estimated traveling trajectory includes meandering having no relationship with a driving lane, or when the estimated traveling trajectory has an abnormal curvature that exceeds a given curvature threshold value.

8. The traveling trajectory estimation system according to claim 1, wherein:
the vehicle performs trajectory following control to travel while following a target trajectory; and
the processor is further configured to calculate an error between the estimated traveling trajectory and the target trajectory, and generate a warning to an operator of the traveling trajectory estimation system or a user of the vehicle, when the error satisfies a warning condition.

9. The traveling trajectory estimation system according to claim 1, wherein the processor is further configured to:
calculate a plurality of vehicle positions at the respective times, as comparable vehicle positions, based on the vehicle traveling information, without using the external recognition information;
calculate an error between the estimated traveling trajectory and the comparable vehicle positions; and
generate a warning to an operator of the traveling trajectory estimation system or a user of the vehicle, when the error satisfies a warning condition.

10. A non-transitory storage medium storing a traveling trajectory estimation program, that when executed by a computer, cause the computer to perform an information acquisition process to acquire traveling record information indicating a past traveling record of a vehicle, and characteristic object position information indicating an installation position of a characteristic object, and a traveling trajectory estimation process to estimate a traveling trajectory of the vehicle, based on the traveling record information and the characteristic object position information, wherein:
the traveling record information includes vehicle traveling information including a traveling state or a position of the vehicle detected by an internal sensor installed on the vehicle, and external recognition information including information on the characteristic object recognized by an external sensor installed on the vehicle;
the traveling trajectory estimation process includes a vehicle position estimation process for estimating a vehicle position as a position of the vehicle;
an object vehicle position is the vehicle position at an object time;
a first reference vehicle position is the vehicle position at a first reference time previous to the object time;

a second reference vehicle position is the vehicle position at a second reference time subsequent to the object time;
a first vehicle movement amount is a movement amount of the vehicle between the first reference time and the object time;
a second vehicle movement amount is a movement amount of the vehicle between the second reference time and the object time;
the vehicle position estimation process includes
obtaining the first vehicle movement amount and the second vehicle movement amount, based on the vehicle traveling information,
obtaining a relative position of the characteristic object recognized at the object time, based on the external recognition information,
calculating the object vehicle position as an internal estimated vehicle position, based on the first reference vehicle position, the first vehicle movement amount, the second reference vehicle position, and the second vehicle movement amount,
calculating the object vehicle position as an external estimated vehicle position, based on the installation position of the characteristic object indicated by the characteristic object position information and the relative position of the characteristic object at the object time,
estimating the object vehicle position by combining the internal estimated vehicle position with the external estimated vehicle position;
performing a localization process during traveling to estimate the vehicle position, based on the vehicle traveling information, the external recognition information, and the characteristic object position information,
calculating an error between the estimated traveling trajectory, and the vehicle position estimated by the localization process, and generate a warning to an operator of the traveling trajectory estimation system or a user of the vehicle, when the error satisfies a warning condition, and
controlling travel of the vehicle based on the estimated vehicle position; and
the traveling trajectory estimation process includes
setting each of a plurality of successive times as the object time, and performing the vehicle position estimation process, to estimate a plurality of object vehicle positions at the respective times, and
determining a collection of the object vehicle positions estimated, as the traveling trajectory of the vehicle.

11. A traveling trajectory estimating method, comprising:
performing an information acquisition process to acquire traveling record information indicating a past traveling record of a vehicle, and characteristic object position information indicating an installation position of a characteristic object; and
performing a traveling trajectory estimation process to estimate a traveling trajectory of the vehicle, based on the traveling record information and the characteristic object position information,
wherein the traveling record information includes vehicle traveling information including a traveling state or a position of the vehicle detected by an internal sensor installed on the vehicle, and external recognition information including information on the characteristic object recognized by an external sensor installed on the vehicle, wherein the traveling trajectory estimation process includes a vehicle position estimation process for estimating a vehicle position as a position of the vehicle, wherein an object vehicle position is the vehicle position at an object time, wherein a first reference vehicle position is the vehicle position at a first reference time previous to the object time, wherein a second reference vehicle position is the vehicle position at a second reference time subsequent to the object time, wherein a first vehicle movement amount is a movement amount of the vehicle between the first reference time and the object time, wherein a second vehicle movement amount is a movement amount of the vehicle between the second reference time and the object time, wherein the vehicle position estimation process includes
obtaining the first vehicle movement amount and the second vehicle movement amount, based on the vehicle traveling information, obtaining a relative position of the characteristic object recognized at the object time, based on the external recognition information, calculating the object vehicle position as an internal estimated vehicle position, based on the first reference vehicle position, the first vehicle movement amount, the second reference vehicle position, and the second vehicle movement amount, calculating the object vehicle position as an external estimated vehicle position, based on the installation position of the characteristic object indicated by the characteristic object position information and the relative position of the characteristic object at the object time, estimating the object vehicle position by combining the internal estimated vehicle position with the external estimated vehicle position, performing a localization process during traveling to estimate the vehicle position, based on the vehicle traveling information, the external recognition information, and the characteristic object position information, calculating an error between the estimated traveling trajectory, and the vehicle position estimated by the localization process, and generate a warning to an operator of the traveling trajectory estimation system or a user of the vehicle, when the error satisfies a warning condition, and controlling travel of the vehicle based on the estimated vehicle position; and wherein the traveling trajectory estimation process includes
setting each of a plurality of successive times as the object time, and performing the vehicle position estimation process, to estimate a plurality of object vehicle positions at the respective times, and determining a collection of the object vehicle positions estimated, as the traveling trajectory of the vehicle.

* * * * *